(12) United States Patent  
Brewka

(10) Patent No.: US 8,348,349 B2  
(45) Date of Patent: Jan. 8, 2013

(54) MINING METHODS AND SYSTEMS USING MOBILE CONVEYORS

(75) Inventor: Christof Brewka, Highlands Ranch, CO (US)

(73) Assignee: ThyssenKrupp Robins, Inc., Greenwood Village, CO (US)

( * ) Notice: Subject to any disclaimer, the term of this patent is extended or adjusted under 35 U.S.C. 154(b) by 394 days.

(21) Appl. No.: 12/793,642

(22) Filed: Jun. 3, 2010

(65) Prior Publication Data

US 2010/0308641 A1 Dec. 9, 2010

Related U.S. Application Data

(60) Provisional application No. 61/183,863, filed on Jun. 3, 2009.

(51) Int. Cl.
*E21C 47/04* (2006.01)

(52) U.S. Cl. .......................................................... 299/18

(58) Field of Classification Search .................. 299/18, 299/10
See application file for complete search history.

(56) References Cited

U.S. PATENT DOCUMENTS

| | | | |
|---|---|---|---|
| 591,047 A | 10/1897 | Mason et al. | |
| 779,043 A | 1/1905 | Hulett | |
| 1,996,488 A * | 4/1935 | Philips ......................... | 198/508 |
| 4,017,122 A | 4/1977 | Simpson | |
| 4,103,972 A | 8/1978 | Kochanowsky | |
| 4,133,581 A | 1/1979 | Satterwhite | |
| 4,150,852 A | 4/1979 | McCoy | |
| 4,150,853 A | 4/1979 | McCoy | |
| 4,183,586 A | 1/1980 | Owen et al. | |
| 4,290,651 A | 9/1981 | Files et al. | |
| 4,345,680 A | 8/1982 | Kay | |
| 4,446,958 A | 5/1984 | Dalrymple | |
| 4,453,770 A | 6/1984 | Dalrymple et al. | |
| 4,466,669 A | 8/1984 | Sellers | |
| 4,489,818 A | 12/1984 | Franke et al. | |
| 4,624,504 A | 11/1986 | Franke et al. | |
| 4,979,781 A | 12/1990 | Bothwell et al. | |
| 5,033,795 A | 7/1991 | Farrar et al. | |
| 5,154,489 A * | 10/1992 | Lemieux ......................... | 299/18 |
| 5,165,757 A | 11/1992 | Grathoff | |
| 5,404,988 A | 4/1995 | Konigs | |
| 5,427,439 A * | 6/1995 | Herickhoff ..................... | 299/64 |
| 5,667,279 A | 9/1997 | Christopher et al. | |
| 5,709,433 A | 1/1998 | Christopher et al. | |
| 5,782,539 A | 7/1998 | Peterson | |

(Continued)

OTHER PUBLICATIONS

International Search Report and Written Opinion dated Aug. 6, 2010, PCT/US2010/037323, 8 pages.

(Continued)

*Primary Examiner* — John Kreck  
(74) *Attorney, Agent, or Firm* — Dorsey & Whitney LLP

(57) ABSTRACT

A conveyor system for an open pit mine may include one or more conveyor lines. The conveyor lines are used to transport material from one location in the mine to another location. The material transported may be a waste material, such as overburden material, or coal. The conveyor lines may move from a first end of the pit to a distal second end. When the conveyor lines reach the second end, they may reverse direction and return towards the first end. During this reversal in direction of travel, equipment may be selectively swapped between the conveyor lines. The conveyor lines may include at least one mobile bridge conveyor. Each mobile bridge conveyor may support one or more conveyors that transport the material.

7 Claims, 33 Drawing Sheets

U.S. PATENT DOCUMENTS

| | | | | |
|---|---|---|---|---|
| 5,810,447 | A | 9/1998 | Christopher et al. | |
| 6,085,890 | A * | 7/2000 | Kelly et al. | 198/303 |
| 6,185,847 | B1 | 2/2001 | Russell et al. | |
| 6,782,993 | B2 * | 8/2004 | Bernard et al. | 198/585 |
| 6,913,321 | B2 | 7/2005 | Harman et al. | |
| 6,916,071 | B2 | 7/2005 | Harman et al. | |
| 7,108,124 | B2 * | 9/2006 | Bernard et al. | 198/617 |
| 7,191,888 | B2 * | 3/2007 | Kahrger et al. | 198/303 |
| 2008/0308384 | A2 * | 12/2008 | Bjornson et al. | 198/301 |

OTHER PUBLICATIONS

Bucket-wheel Excavator [online], Wikipedia, [retrieved on May 22, 2009]. Retrieved from the Internet: <URL: http://en.wikipedia.org/wiki/Bucket-wheel excavator>.

Opencast Mining Systems and Equipment, Brochure Published by PWH Materials Handling (fka PHB Weserhutte), believed to be published at least as early as 1982.

Operating Principles of the F60 [online], MAN TAKRAF Lauchhammer (fka VEB TAKRAF Lauchhammer), [retrieved on May 22, 2009]. Retrieved from the Internet: <URL: http://www.f60.de/index_e.htm>.

Overburden Conveyor Bridge F60 [online], Wikipedia, [retrieved on May 22, 2009]. Retrieved from the Internet: <URL: http://en.wikipedia.org/wiki/Overburden_Conveyor_Bridge_F60>.

Tenova Conveyor Bridge F60 [online], TAKRAF GmbH, [retrieved on May 22, 2009]. Retrieved from the Internet: <URL: http://www.takraf.com/en/aboutus/history>.

Tenova Conveyor Bridges [online], TAKRAF GmbH, [retrieved on May 22, 2009]. Retrieved from the Internet: <URL: http://www.takraf.com/en/aboutus/history>.

Tenova Products [online], TAKRAF GmbH, [retrieved on May 22, 2009]. Retrieved from the Internet: <URL: http://www.takraf.com/en/products/main.htm>.

E. Rodenberg et al., "Direct Dumping Mining Systems—Application and Economics," *International Journal of Mining, Reclamation and Environment*, 1988, 2:4, 193-208.

* cited by examiner

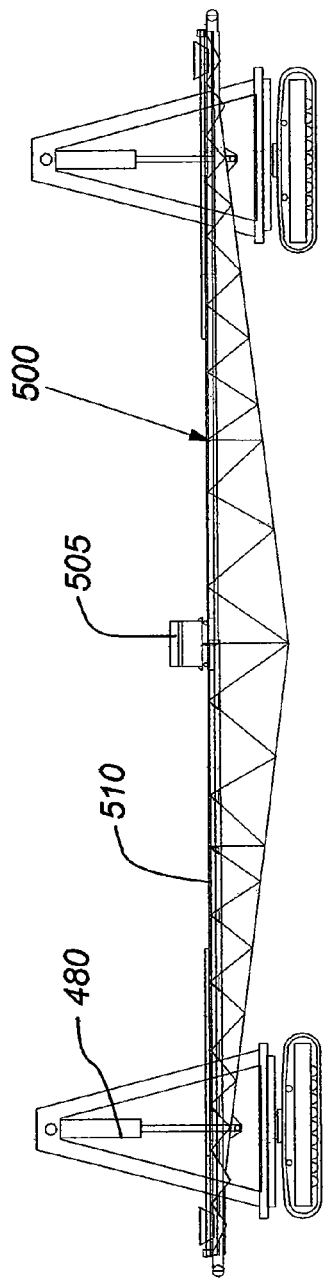
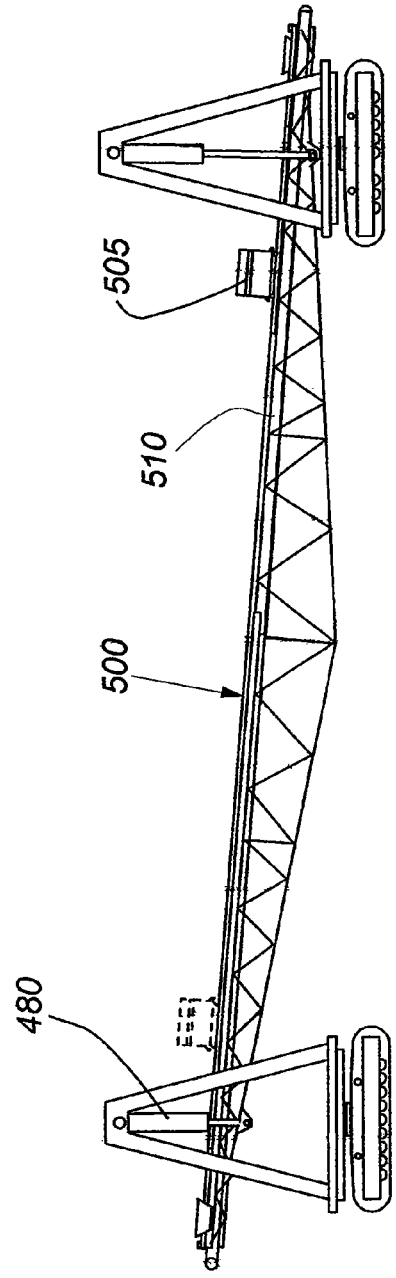
Fig. 32A
Fig. 32B

MINING METHODS AND SYSTEMS USING MOBILE CONVEYORS

CROSS-REFERENCE TO RELATED APPLICATIONS

This application claims, under 35 U.S.C. §119(e), the benefit of U.S. provisional application No. 61/183,863, entitled "Mining Methods and Systems Using Mobile Conveyors" and filed on Jun. 3, 2009, the entirety of which is hereby incorporated herein by reference.

FIELD OF INVENTION

The present invention generally relates to conveyors, and more particularly to mobile conveyor systems and methods for use in surface mining operations.

BACKGROUND

In an open pit mine, soil, rocks and other material, referred to as overburden material, are excavated to uncover the material of interest (i.e., the mined material), such as coal. Once removed, the excavated material is generally transported to another area of the mine. Methods for transporting from the removal area to another location include using trucks, cross-pit conveyors and other various conveyor systems. Another transportation method involves excavating material with a dragline and dumping it away from the excavation area. While these transportation methods are widely used, they tend to be very costly or impractical as the amount of overburden material overlying the mined material increases. Accordingly, what is needed in the art is an improved method and system for moving excavated material from its removal location to a desired location in an open pit mine.

SUMMARY OF THE INVENTION

One embodiment of the present invention may take the form of a conveyor system for an open pit mine. The conveyor system may include a first conveyor line extending from an overburden side of the mine to a stack side of the mine, and a second conveyor line extending from the overburden side of the mine to the stack side of the mine. The first conveyor line may include at least one mobile bridge conveyor, and the second conveyor line may include at least one mobile bridge conveyor. The first conveyor line may be operatively associated with excavation equipment operating at a first location in the mine, and the second conveyor line may be operatively associated with excavation equipment operating at a second location in the mine. The first conveyor line may transport at least a portion of the material excavated from the first location in the mine to a third location in the mine, and the second conveyor line may transport at least a portion of the material excavated from the second location in the mine to a fourth location in the mine. In some embodiments, the system may further include a third conveyor line extending from the overburden side of the mine to the stack side of the mine. In such embodiments, the third conveyor line may include at least one mobile bridge conveyor, may be operatively associated with excavation equipment operating at a fifth location in the mine, and may transport at least a portion of the material excavated from the fifth location in the mine to a sixth location in the mine Another embodiment of the present invention may take the form of a method for operating a conveyor system. The method may include moving a first conveyor line in a first direction, and moving a second conveyor line in a second direction. The second direction may be opposite the first direction such that the first and the second conveyor lines move towards each other. When the first conveyor line is proximate the second conveyor line, the method may include removing at least one mobile bridge conveyor from either the first or second conveyor lines and adding the removed at least mobile bridge conveyor to the other conveyor line. In some embodiments, the method may further include moving the first conveyor line in the second direction and the second conveyor line in the first direction after the removal and addition operation. In such embodiments, the method may further include moving a third conveyor line in the second direction such that the second and the third conveyor lines move towards each other. In these embodiments, when the second conveyor line is proximate the third conveyor line, the method may yet further include removing at least one mobile bridge conveyor from either the second or third conveyor lines and adding the removed at least mobile bridge conveyor to the other conveyor line.

Yet another embodiment of the present invention may take the form of a conveyor system for an open pit mine. The conveyor system may include a first conveyor line extending from an overburden side of the mine to a stack side of the mine, and a second conveyor line extending from the overburden side of the mine to the stack side of the mine. The first conveyor line may include three mobile bridge conveyors. Each mobile transfer conveyor may be aligned to at least receive material from or transfer material to an adjacent mobile bridge conveyor. The second conveyor line may include at least one mobile bridge conveyor. The first conveyor line may be operatively associated with excavation equipment operating at a first location in the mine. The second conveyor line may be operatively associated with excavation equipment operating at a second location in the mine. The first conveyor line may be configured to transport at least a portion of the material excavated from the first location in the mine to a third location in the mine. The second conveyor line may be configured to transport at least a portion of the material excavated from the second location in the mine to a fourth location in the mine.

Still yet another embodiment of the present invention may take the form of a conveyor system for an open pit mine. The conveyor system may include a conveyor line extending from an overburden side of the mine to a stack side of the mine. The conveyor line may include a first mobile bridge conveyor. The first mobile bridge conveyor may include a first conveyor positioned above a second conveyor. The first conveyor may be operatively associated with excavation equipment operating at a first location in the mine. The second conveyor may be operatively associated with excavation equipment operating at a second location in the mine. The first conveyor may transport at least a portion of the material excavated from the first location in the mine to a third location in the mine. The second conveyor may transport at least a portion of the material excavated from the second location in the mine to a fourth location in the mine.

BRIEF DESCRIPTION OF THE DRAWINGS

FIG. 32A shows a schematic elevation view of a face conveyor for use in an a conveyor system, such as the system shown in FIG. 25.

FIG. 32B shows a schematic elevation view of the face conveyor shown in FIG. 32A, showing one end of the face conveyor raised and the hopper car positioned at a different location.

DETAILED DESCRIPTION

Described herein are methods and systems for moving material excavated in an open pit mine to a desired location. The methods and systems may take the form of mobile bridge conveyors that are selectively associated with other mobile bridge conveyors to form one or more mobile bridge conveyor lines. Each bridge conveyor line may receive material from excavation equipment, either directly or indirectly, and transport the material from one location or area in the mine to another location or area within the mine. For example, the material may removed from an overburden side of the mine and transported using a bridge conveyor line to a stack side of the mine in order replace material previously excavated from the stack side of the mine. As another example, material, such as coal, may be transported from a coal seam in the mine to another desired location in the mine using a bridge conveyor line. Some versions of the method and system may include two or more bridge conveyor lines, each configured to receive material at one level of the mine on the overburden side and to deliver the material to the stack side. Often, although it is not required, the bridge conveyor lines are configured to deliver the material on the stack side at approximately the same level as the level from which the material is excavated on the overburden side. Some other versions of the method and system may include one or more mobile bridge conveyor that support two or more conveyors. For some of these bridge conveyors that support more than one conveyor, one conveyor may be positioned above the other conveyor. For other such bridge conveyors, the conveyors may be positioned on the bridge conveyor as side-by-side conveyors.

Figure 1:
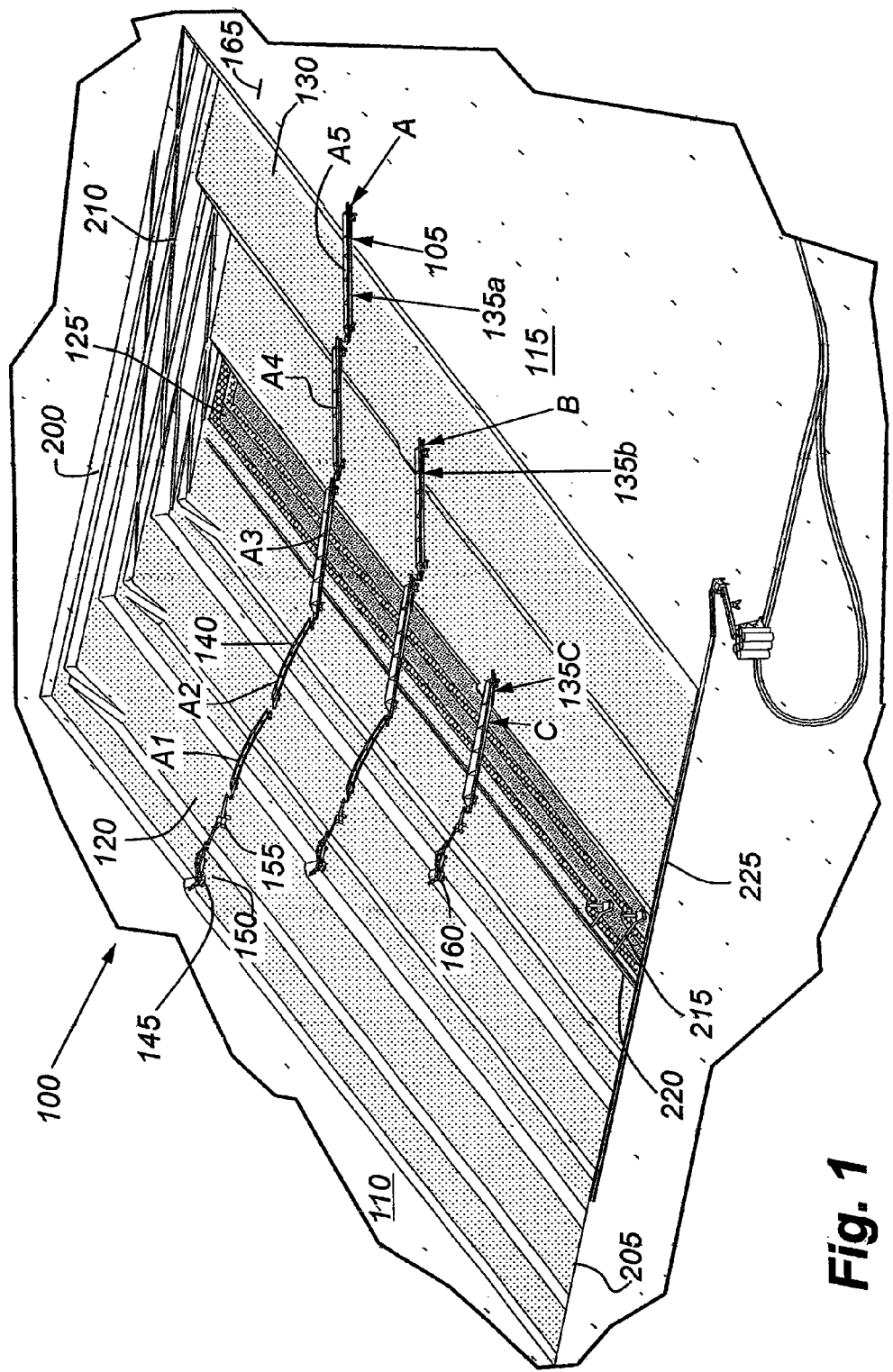
FIG. 1 shows a schematic isometric view of an open pit mine showing one possible conveyor system for transporting material from one area or location of the mine to another area or location.
Figure 2:
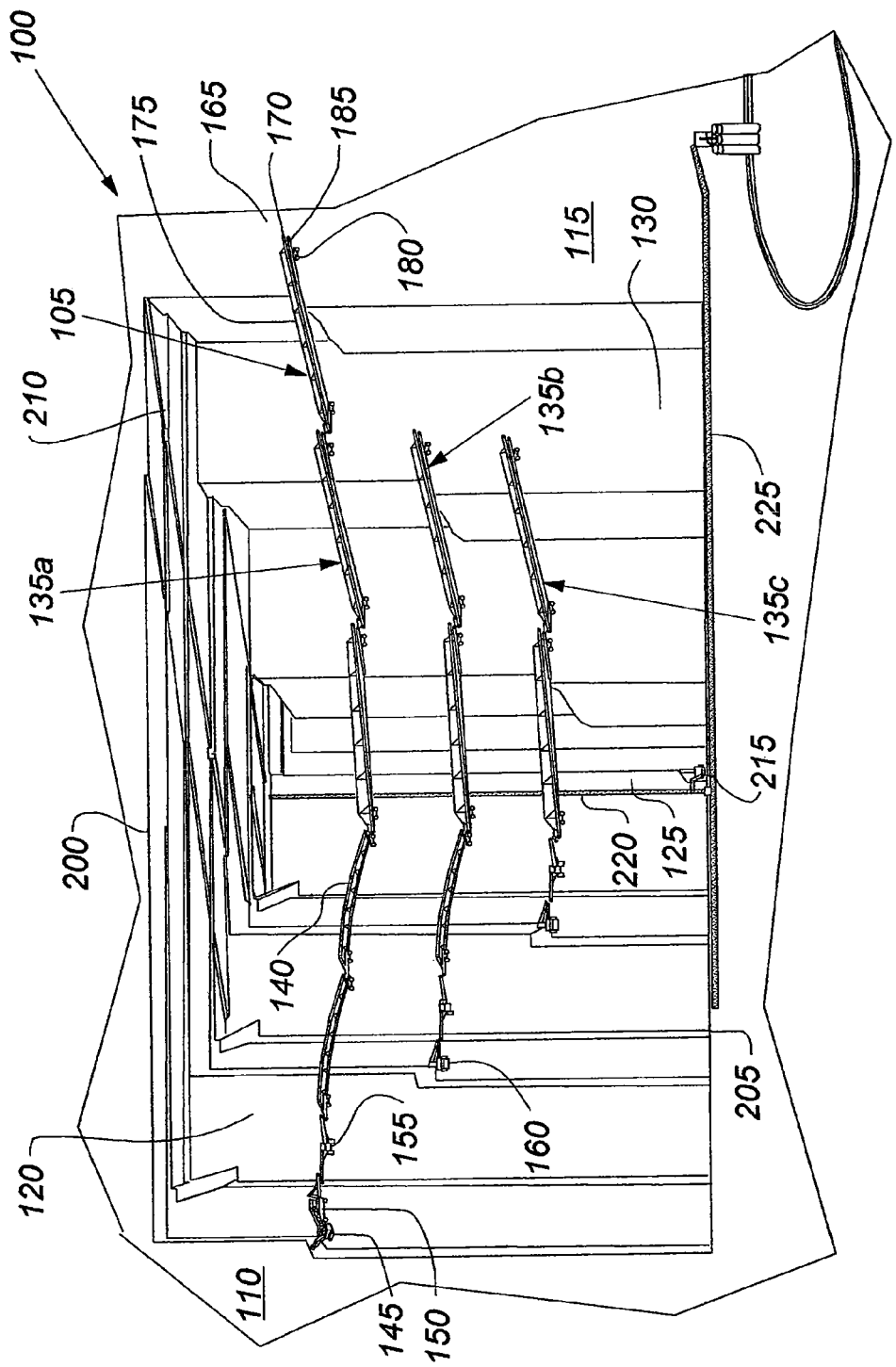
FIG. 2 shows a schematic perspective view of the open pit mine shown in FIG. 1.
Figure 3:
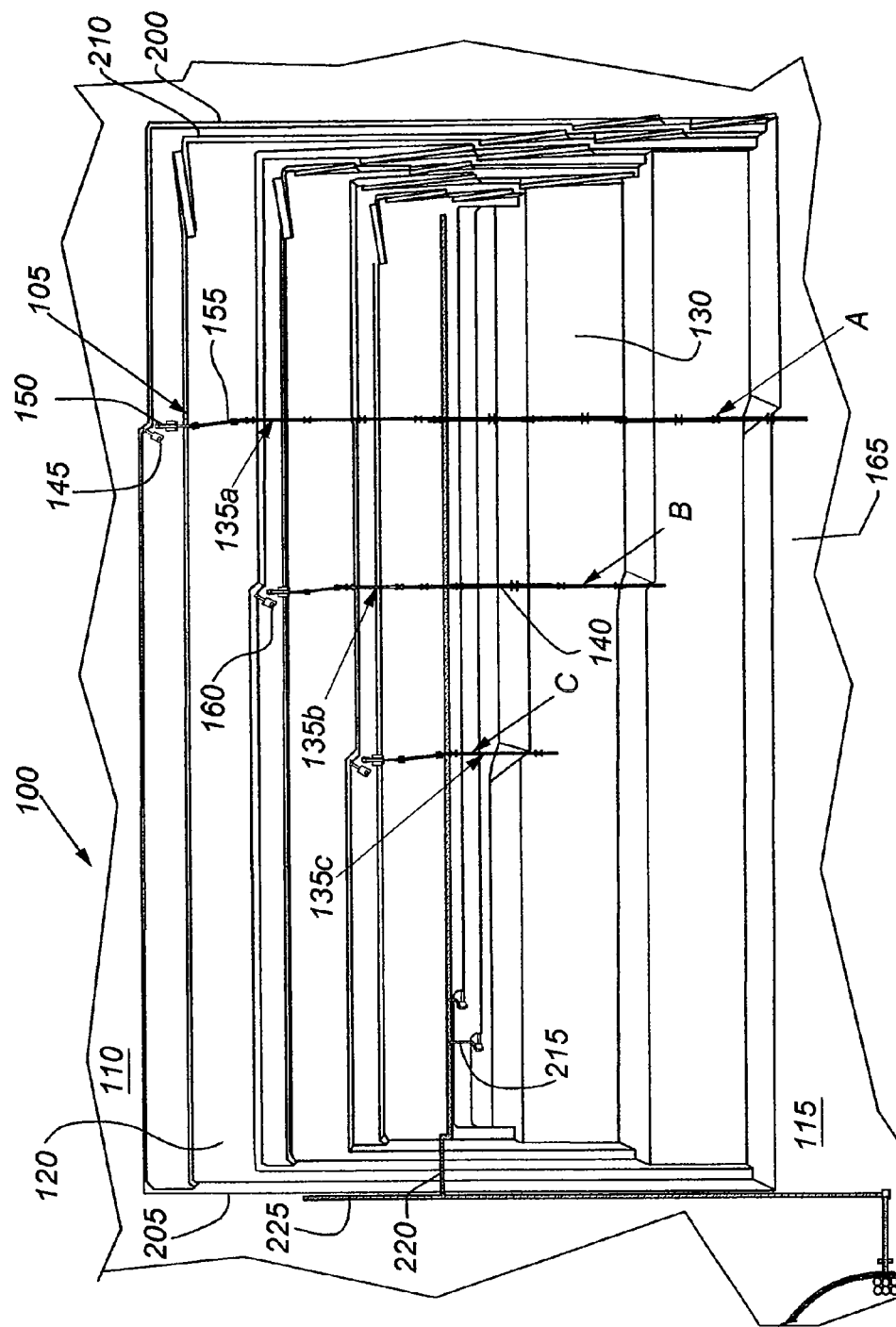
FIG. 3 shows a plan view of the open pit mine shown in FIG. 1.
Figure 4:
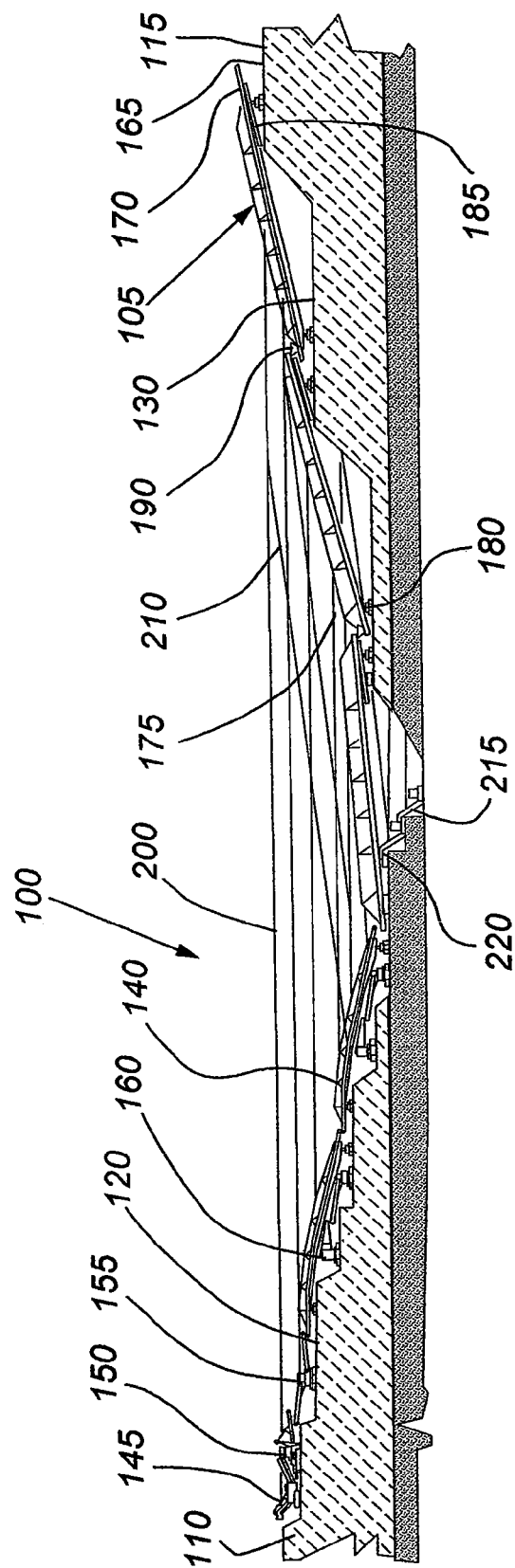
FIG. 4 shows a vertical cross-section view of the open pit mine shown in FIG. 1.

FIG. 1 is an isometric view of an open pit mine 100 showing one possible conveyor system 105 for transporting material from one area, such an overburden side 110, to another area of the mine 100, such as a stack side 115 (which may also be referred to as a "spoil side"). FIG. 2 is a perspective view of the open pit mine 100 shown in FIG. 1 showing another view of the conveyor system 105 depicted in FIG. 1. FIG. 3 is a plan view of the open pit mine 100 shown in FIG. 1 showing another view of the conveyor system 105 depicted in FIG. 1. FIG. 4 is a vertical cross-section view of the open pit mine 100 shown in FIG. 1.

With reference to FIGS. 1-4, the open pit mine 100 includes an overburden side 110 and a stack side 115. On the overburden side 100, shovels, bucket wheel excavators or other earth excavation equipment remove soil, dirt, rock and other material to expose a material to be mined, such as coal. As shown in the figures, typically one or more overburden benches 120 are formed on the overburden side 110 as the material is removed to expose one or more coal seams 125. As material is removed by the excavation equipment, the overburden benches 120 move further towards the left-hand side of the page.

Material removed from the overburden side 115 is transported to the stack side 115. This material is deposited on the stack side 115 to replace the material previously removed from the stack side 115. As shown in the figures, the stack side 115 may include one or more stack benches 130. As material is deposited on the stack side 115, the stack benches 130 move towards the left hand side of the page. In short, material removed from the overburden side 110 is transported and deposited on the stack side 115, thus resulting in the open pit mine 100 generally moving from the right hand side to the left hand side of the page. While the open pit mine 100 is shown as progressing from the right hand side to the left hand side of the page, the mine 100 could progress in any desired direction.

To transport excavated material from the overburden side 110 to the stack side 115, one or more bridge conveyor lines 135a-c may be used. For the mine 100 shown in FIGS. 1-3, three bridge conveyor lines 135a-c are used. However, the number of bridge conveyor lines may be more or less than three. The number of bridge conveyor lines may be a function, in part, of the number of overburden benches 120 formed on the overburden side 110. For example, for the mine 100 shown in FIGS. 1-4, three overburden benches 120 are being formed, thus three bridge conveyor lines 135a-c are shown. Each bridge conveyor line 135a-c is associated with at least one of the overburden benches 120. While each overburden bench is shown as having at least one of the bridge conveyor lines 135a-c associated with it, other methods could be used to transport and deposit the excavated material from the overburden bench 120 to the stack side 115 of the mine 100, such as transporting and dumping the material using trucks or draglines. Generally, though, at least two bridge conveyor lines will be used.

The three bridge conveyor lines 135a-c are labeled in FIG. 1 as "A", "B", and "C" for ease of reference. With continued reference to FIGS. 1-4, bridge conveyor line "A" 135a includes five mobile bridge conveyors 140 that can transport material removed from an upper level of the overburden side 110 to an upper level of the stack side 115. For ease of reference, each mobile bridge conveyor 140 in bridge conveyor line A 135a is labeled as "A1" through "A5". Bridge conveyor line "B" 135b includes three mobile bridge conveyors 140 that can transport material removed from an intermediate level of the overburden side 110 to an intermediate level of the stack side 115. Bridge conveyor line "C" 135c includes one mobile bridge conveyor 140 that can transport material removed from a lower level of the overburden side 110 to a lower level of the stack side 115.

While each bridge conveyor line 135a-c is shown as including a specific number of mobile bridge conveyors 140, the number of mobile bridge conveyors 140 used in any line 135a-c may be, in part, a function of the number of benches 120, 130 on the overburden and the stack sides 110, 115, the level of the mine 100 from which material will be loaded onto the bridge conveyor line 135a-c on the overburden side 110, and/or the desired level of the mine 100 on the stack side 115 for depositing the material transported by the bridge conveyor line 135a-c. The bridge conveyor lines 135a-c shown in FIGS. 1-4 can facilitate transporting excavated material from the level that is it removed on the overburden side 110 to an equivalent, or approximately equivalent, level on the stack side 115. Such transportation of the material can be advantageous since material removed from the upper level of the overburden side 110 can be deposited at the upper level of the stack side 115, material removed from the intermediate level of the overburden side 110 can be deposited at the intermediate level of the stack side 115, and material removed from the lower level of the overburden side 110 can be deposited at the lower level of the stack side 115.

With continued reference to FIGS. 1-4, material removed from an overburden bench 120 may be transferred from the excavation equipment to any of the bridge conveyor lines 135a-c by any suitable method. For example, a shovel 145 or the like may deliver material to a mobile crusher 150 or the like. Continuing with the example, the mobile crusher 150 may crush the material, if needed, to make it easier to handle. Still continuing with the example, the mobile crusher 150 may transfer the material to a mobile transfer conveyor 155, and the mobile transfer conveyor 155 may transfer the material to one of the mobile bridge conveyors 140 that form one of the bridge conveyor lines 135a-c. As another example, a bucket wheel excavator 160 may deliver material to a mobile transfer conveyor 155. Continuing with this example, the mobile transfer conveyor 155 may then deliver the material to one of the mobile bridge conveyors 140 that form one of the bridge conveyor lines 135a-c. The foregoing examples are merely illustrative and are not intended to imply or require a particular method for transferring material from the excavation equipment to a bridge conveyor line. For example, while both examples describe use of one or more intermediate pieces of equipment, such as mobile crushers 150 and mobile transfer conveyors 155, to transfer the material from the excavation equipment to a mobile bridge conveyor 140 that forms one of the bridge conveyor lines 135a-c, the excavation equipment could deliver the material directly to the mobile bridge conveyor 140.

Once excavated material is delivered to a mobile bridge conveyor 140, the mobile bridge conveyor 140 may deliver the material via a conveyor supported by the mobile bridge conveyor 140 to an adjacent mobile bridge conveyor 140 in the bridge conveyor line 135a-c. This continues until the material reaches the mobile bridge conveyor 130 positioned at the location where the material will be deposited on the stack side 115, or other location, of the mine 100. Once the material reaches this mobile bridge conveyor 140, it is delivered from the mobile bridge conveyor 140 to the desired location.

For example, material may be transferred onto mobile bridge conveyor A1 140 for transportation of the material, using the mobile bridges A1-A5 in the bridge conveyor line A 135a, from a first location of the mine 100 (e.g., an upper level of the mine 100 on the overburden side 110) to a second location of the mine 100 (e.g., to an upper level of the mine 100 on the stack side 115). Continuing with the example, after transferring the material mobile bridge conveyor A1 140, mobile bridge conveyor A1 140 may transfer the material to mobile bridge conveyor A2 140, which in turn may transfer the material to mobile bridge conveyor A3 140. Still continuing with the example, mobile bridge conveyor A3 140 may transfer the material to mobile bridge conveyor A4 140, which may in turn transfer the material to mobile bridge conveyor A5 140. Yet continuing with the example, mobile bridge conveyor A5 140 may deposit the material at the second location of the mine, such as on the stack side 115 of the mine 100 at an upper surface 165 of the mine 100 or at a stack bench 130 located at an upper level of the mine 100. While the foregoing example describes the material as being delivered to an upper level the mine 100, the material could be delivered to an intermediate or lower level of the mine 100 by depositing material from mobile bridge conveyor A4 or A3 140, respectively, into the mine 100 rather than transferring the material onto the next mobile bridge conveyor 140 in the bridge conveyor line 135a. Material excavated at third or fifth locations of the mine 100, such as at intermediate and lower levels of the mine 100 on the overburden side 110, may also be transferred from the overburden side 110 to fourth or sixth locations of the mine 100, such as to intermediate or lower levels of the mine 110 on the stack side 115 of the mine 100, using one or more of bridge conveyor lines B and C 135b-c. The procedure for transferring the material from these other locations using bridge conveyor lines B and C 135b-c is similar to the procedure described above for bridge conveyor line A 135a.

Each mobile bridge conveyor 140 may include a conveyor 170 supported by a bridge structure 175. The bridge structure 175 for each mobile conveyor 140 may be or may not be arched. Arching a bridge structure 175 provides additional clearance to allow equipment, such as trucks or excavators, to pass under the bridge structure 175. Each end portion of the bridge structure 175 may be supported by a crawler 180. The crawlers 180 allow the mobile bridge conveyor 140 to be moved to a desired location in the mine 100. Each bridge structure 175 may also support a hopper. The hopper may receive material from the excavation equipment 145, a mobile crusher 150, a transfer conveyor 155, or an adjacent bridge conveyor 140 for delivery onto the conveyor 170 of the mobile bridge conveyor 140. If desired, the hopper may be omitted from any or all of the mobile bridge conveyors 140 provided some other suitable equipment or system is used to controllably direct material onto the receiving belt of the conveyor 170. Any or all of the mobile bridge conveyors 140 may include a shuttle conveyor 185 supported by the bridge structure 175. The shuttle conveyors 185 may be used to deposit material transported on a mobile bridge conveyor 140 into the mine 100 at a desired location. Typically, mobile bridge conveyors 140 with at least one end positioned on the stack side 115 of the mine 100 will include a shuttle conveyor 185.

Figure 5:
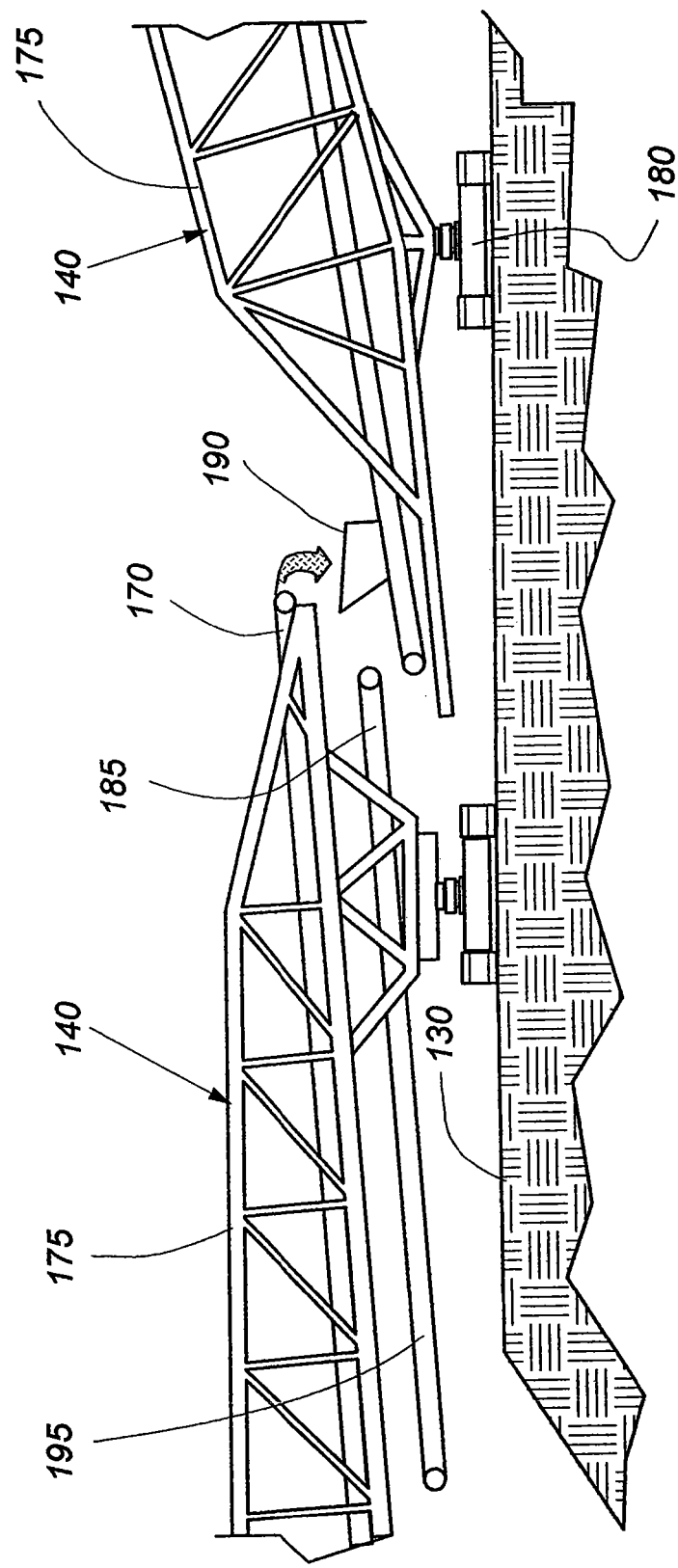
FIG. 5 shows a schematic elevation view of end portions of two mobile bridge conveyors for use in the conveyor system shown in FIGS. 1-4.
Figure 6:
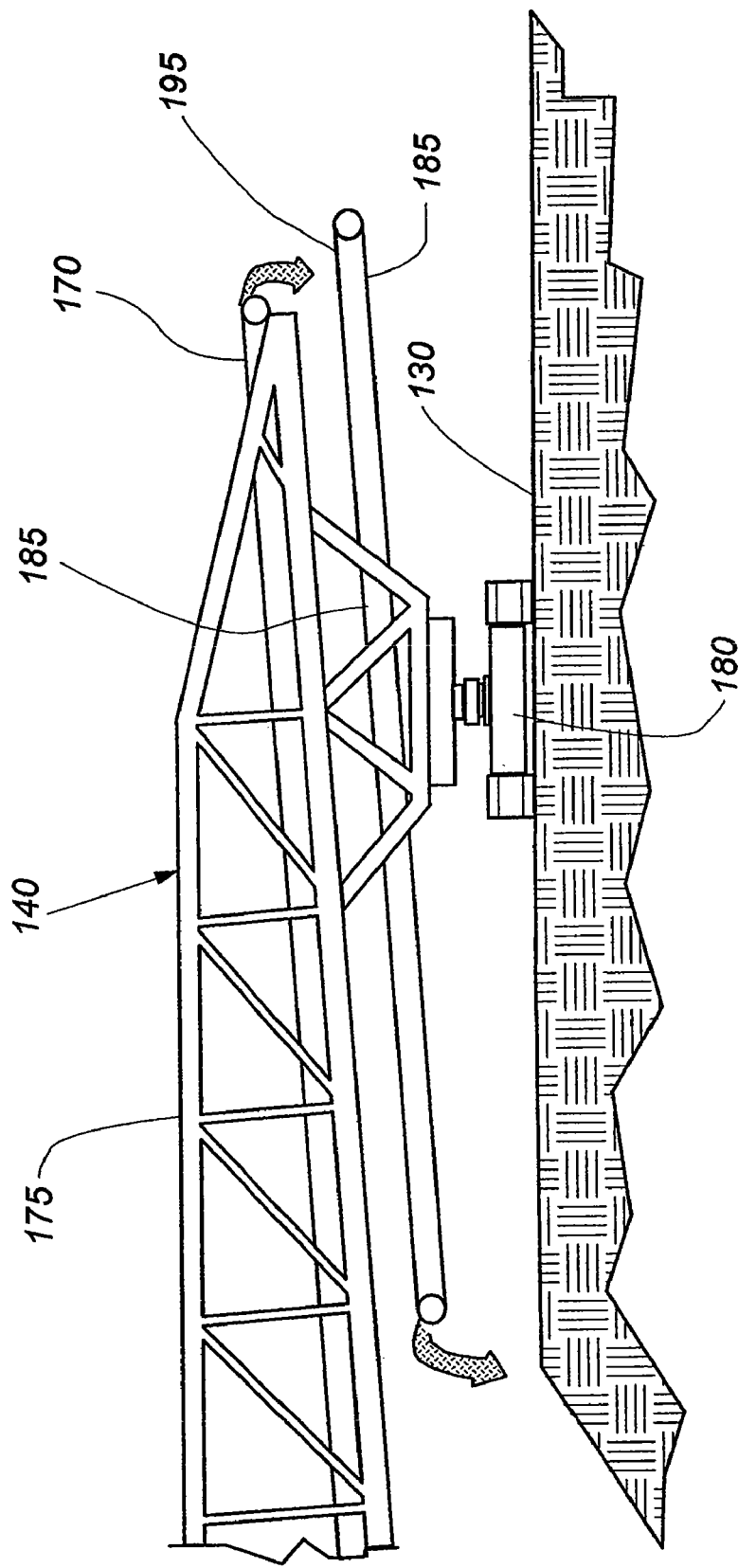
FIG. 6 shows a schematic elevation view of an end portion of a mobile bridge conveyor for use in the conveyor system shown in FIGS. 1-4.
Figure 7:
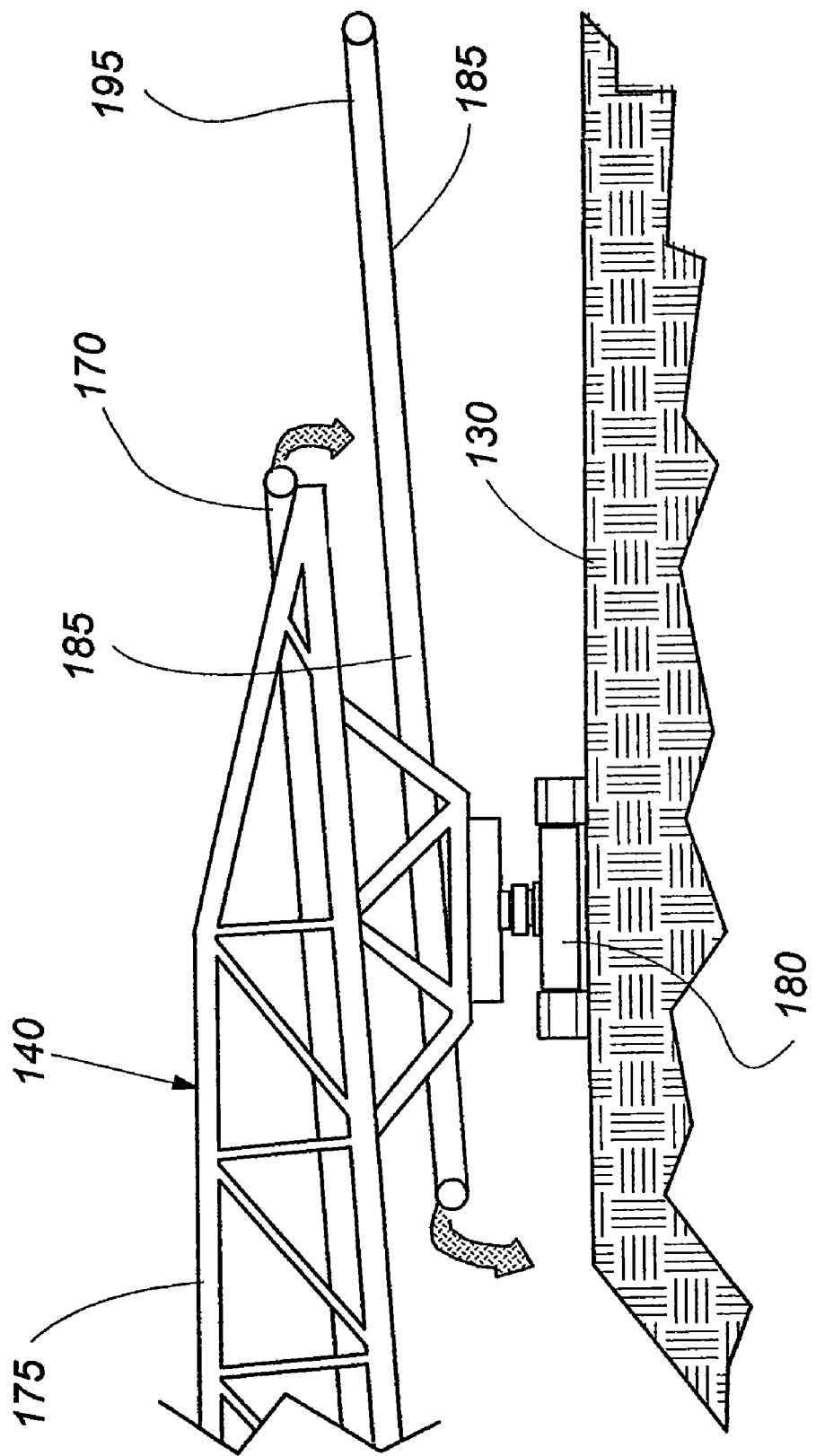
FIG. 7 shows a schematic elevation view similar to the view shown in FIG. 6.
Figure 8:
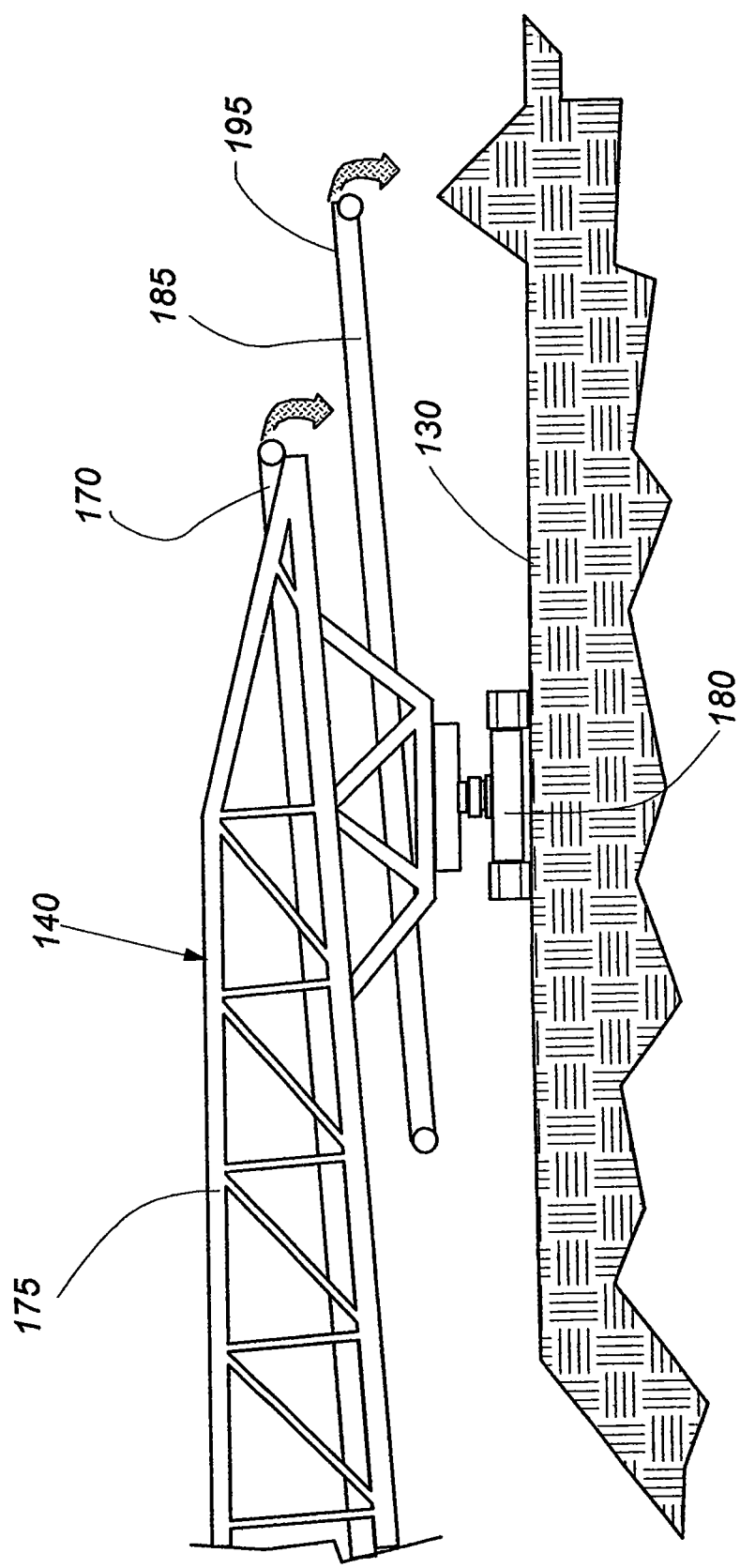
FIG. 8 shows a schematic elevation view similar to the view shown in FIG. 6.

FIGS. 5-8 depict side elevation views of portions of mobile bridge conveyors 140. FIG. 5 shows material transferred from one mobile bridge conveyor 140 to an adjacent mobile bridge conveyor 140. FIG. 6 shows one potential position of a shuttle conveyor 185 for depositing material into the mine 100 from a mobile bridge conveyor 140. FIG. 7 shows another potential position of a shuttle conveyor 185 for depositing material into the mine from a mobile bridge conveyor 140. FIG. 8 shows yet another potential position for depositing material into the mine 100 from a mobile bridge conveyor 140.

With reference to FIG. 5, material may be delivered from the conveyor 170 of a mobile bridge conveyor 140 into a hopper 190 supported by an adjacent mobile bridge conveyor 140. From the hopper 190, the material may be passed to the conveyor 170 of the adjacent mobile bridge conveyor 140 to be conveyed either to another adjacent mobile bridge conveyor 140, or to be discharged into the mine 100 from the other end of the mobile bridge conveyor 140, as shown, for example, in FIG. 6. As discussed above, the hopper 190 could be omitted and the material could be discharged directly from the conveyor 170 of the mobile bridge conveyor 140 to the conveyor 170 of the adjacent mobile bridge conveyor 140. Further, while FIG. 5 shows material being directly transferred from one mobile bridge conveyor 140 to an adjacent mobile bridge conveyor 140, material could be indirectly transferred. For example, a mobile transfer conveyor 155 could be interposed between adjacent mobile bridge conveyors 140. Continuing with the example, material could be delivered from one mobile bridge conveyor 140 to the mobile transfer conveyor 155, which in turn would deliver material to the adjacent mobile bridge conveyor 140. The foregoing example is merely illustrative and is not intended to imply or require any particular method or system for indirectly transferring material between adjacent mobile bridge conveyors 140.

Turning to FIGS. 6-8, material may be discharged into the mine 100 from a mobile bridge conveyor 140 by delivering material onto the shuttle conveyor 185 from the conveyor 170. Material from the shuttle conveyor 185 is then discharged from the mobile bridge conveyor 140 into the mine 100 from an end of the shuttle conveyor 185. As shown in the FIGS. 6-8, the shuttle conveyor 185 may move material from the right to the left end of the shuttle conveyor 185 for discharge at the left end of the shuttle conveyor 185, or vice versa. Further, the shuttle conveyor 185 may be movably joined to the bridge structure 175 so that it can be selectively moved along its axial length relative to the bridge structure 175. Such axial movement of the shuttle conveyor 185 allows for material to be discharged from the shuttle conveyor 185 at different locations relative to the crawler 180 supporting the bridge structure 175.

For example, FIG. 6 shows the shuttle conveyor 185 positioned in its left most position relative to the crawler 180. Further, the shuttle conveyor belt 195 is moving material from the right to the left end of the shuttle conveyor 185. In this configuration, material can be delivered onto an end portion of a bench, or the top surface of the mine 100, with the crawler 180 relatively distal from the end of the bench, or the top surface. In FIG. 7, the crawler 180 is closer to the end of the bench, or the top surface, than in FIG. 6, thus the shuttle conveyor 185 is positioned in its right most position relative to the crawler 180. Like in FIG. 6, the shuttle conveyor belt 195 is moving material from the right end to the left end of the shuttle conveyor 185. Thus, this configuration, like the configuration in FIG. 6, results in material being delivered from the shuttle conveyor 185 onto an end portion of the bench, or the top surface. In other words, the ability to move the shuttle conveyor 185 relative to the crawler 180 in the axial direction allows for the crawler 180 to be located at different positions relative to an end portion of a bench, or the top surface, while allowing for material to be delivered as desired to an end portion of the bench, or the top surface, without moving the crawler 180 closer to, or further from, the end portion of the bench or top surface. This allows a mobile bridge conveyor 140 to prepare the traveling surface supporting its crawlers 180 near its discharge end.

The shuttle conveyor 185 may also be used to deliver material to other portions of a bench, or the top surface of the mine 100. For example, FIG. 8 shows the mobile bridge conveyor 140 with the crawler 180 positioned in approximately the same position relative to an end portion of bench as shown in FIG. 6. The shuttle conveyor 185, however, has been moved to a position relative to the crawler 180 that is closer to the right most position shown in FIG. 7. Further, the shuttle conveyor belt 195 is moving material from the left to the right end of the shuttle conveyor 185. In this configuration, material is being deposited onto the bench away from the end portion of the bench.

As these examples demonstrate, the position of the shuttle conveyor 185 relative to the crawler 180 and the position of the crawler 180 on a bench, or the top surface of the mine 100, allows for material to be deposited at desired locations within the mine 100. Further, the ability to move the shuttle conveyor 185 relative to the crawler 180 allows for material to be deposited at different locations on a bench, or the top surface of the mine 100, without moving the crawler 180 transverse to the direction of travel of the bridge conveyor lines 135a-c. Yet further, the ability to discharge material from either end of the shuttle conveyor 185 further allows for material to be deposited at different locations on a bench, or the top surface of the mine 100, without moving the crawler 180 transverse to the direction of travel of the bridge conveyor lines 135a-c.

Returning to FIG. 1, the mine 100 may include two end walls 200, 205. Ramps 210 or the like may be formed at one or more of the end walls 200, 205 to allow trucks and other equipment to access the various benches 120, 130. In FIG. 1, ramps 210 are shown at one end wall 200. Ramps 210, however, could be formed at either end wall 200, 205, or both. For ease of reference, the end wall 200 with the ramps 210 will be referred to as the "ramp end wall" and the end wall 205 without ramps 210 will be referred to as the "non-ramp end wall." Use of these terms for the end walls 200, 205 is merely for convenience and does not imply or require any specific relationship between the location of ramps 210 relative to the end walls 200, 205 of the mine.

With continued reference to FIG. 1, the excavation and other equipment generally move back and forth between the ramp and non-ramp end walls 200, 205. When the equipment reaches one of the end walls 200, 205, it begins to move back towards the other end wall 200, 205. The equipment may also be moved slightly towards the left hand side of the mine (i.e., towards the overburden side 110 of the mine 100) when it reaches an end wall 200, 205. For example and with reference to FIG. 1, the equipment (including the bridge conveyor lines 135*a-c*) is generally moving towards the ramp end wall 200. Continuing with the example, once the equipment reaches the ramp end wall 200, the equipment will reverse direction and head towards the non-ramp end wall 205.

As the bridge conveyor lines 135*a-c* approach an end wall 200, 205 and reverse direction, a swapping operation is needed to allow the bridge conveyor lines 135*a-c* to begin moving towards the other end wall 200, 205. This swapping operation is schematically illustrated in FIGS. 9-16. For ease of reference, each of the bridge conveyor lines 135*a-c* in FIGS. 9-16 are labeled (i.e., "A", "B", or "C"). Additionally for ease of reference, each mobile bridge conveyor 140 is labeled (i.e., "T-A1" through T-E1"), each bucket wheel excavator 160 is labeled (i.e., "BWEO-1" and "BWEO-2"), and each mobile transfer conveyor 155 is labeled (i.e., "BW-1" and "BW-2").

Figure 9:
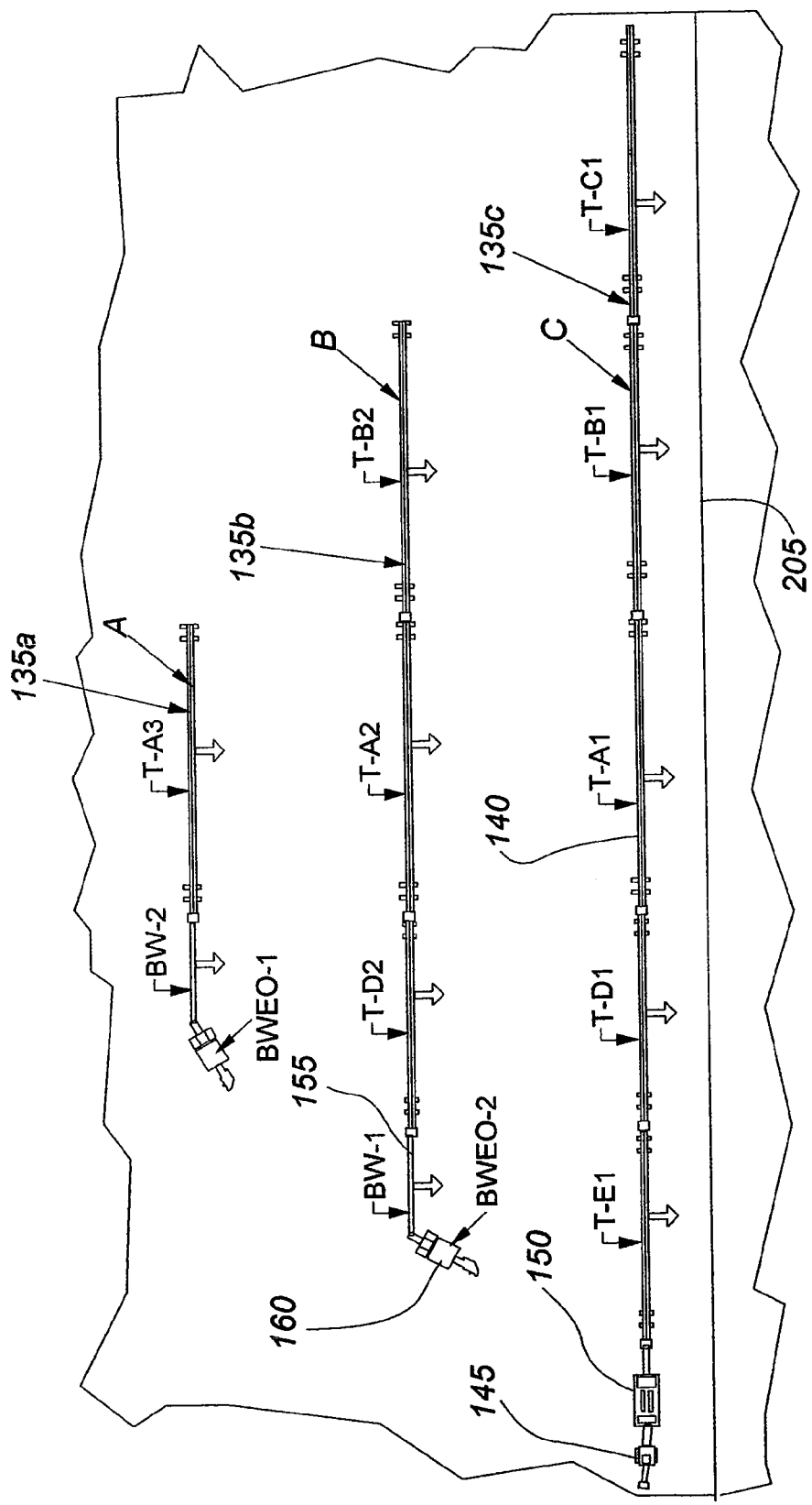
FIG. 9-16 show schematic plan views of the bridge conveyor lines shown in FIGS. 1-4 showing various steps in a swapping sequence as the bridge conveyor lines approach an end wall and reverse their direction of travel.
Figure 10:
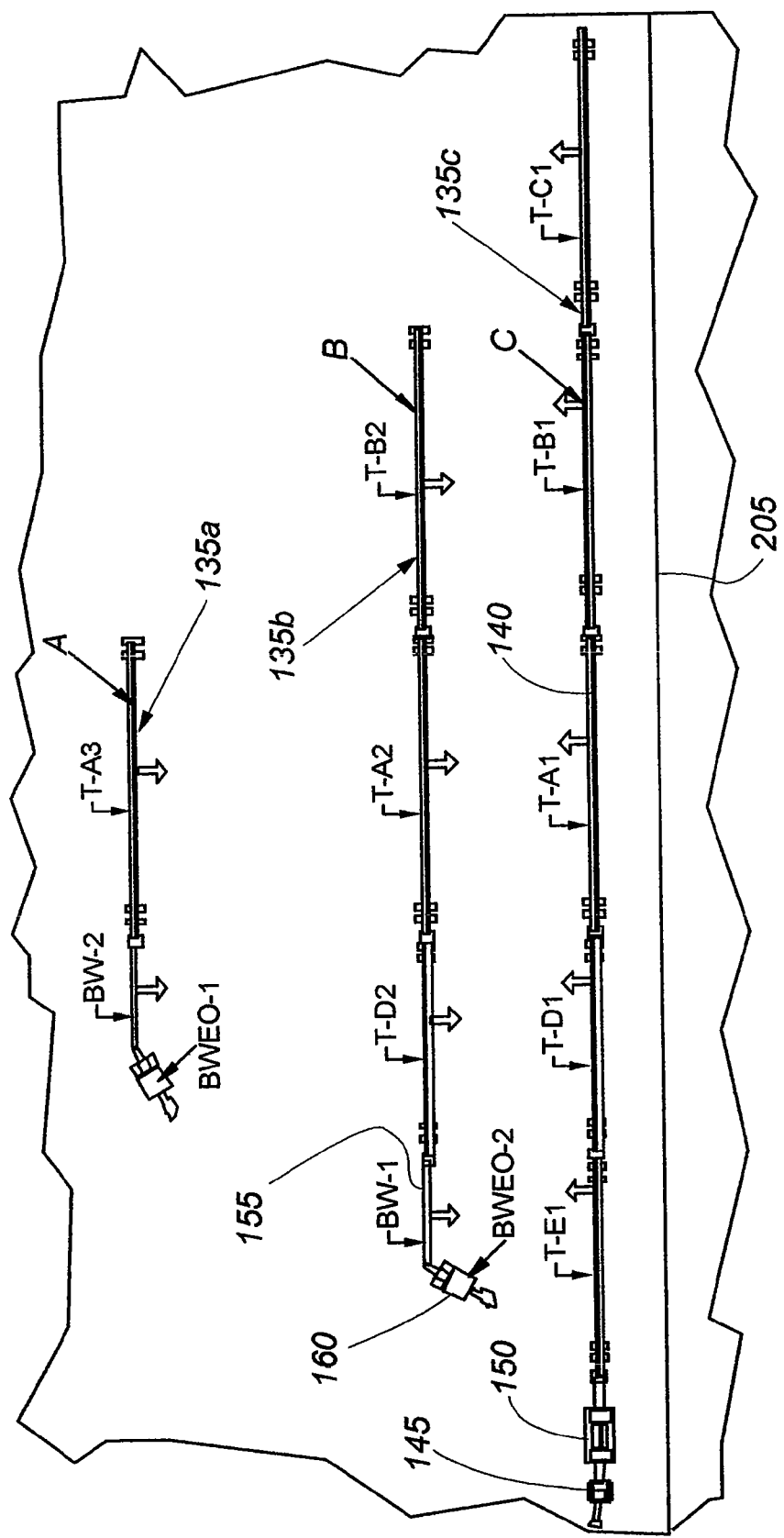
Figure 11:
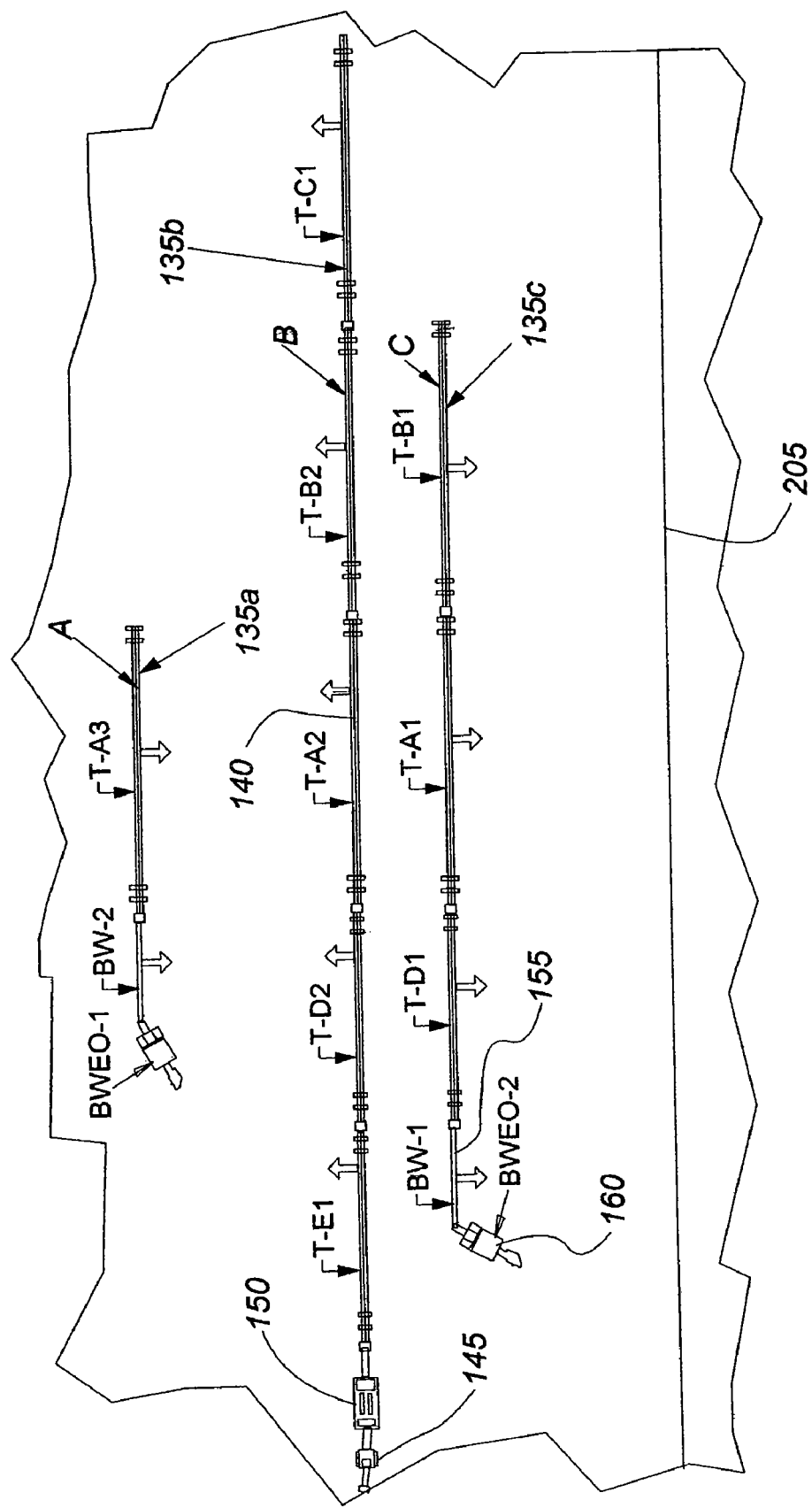
Figure 12:
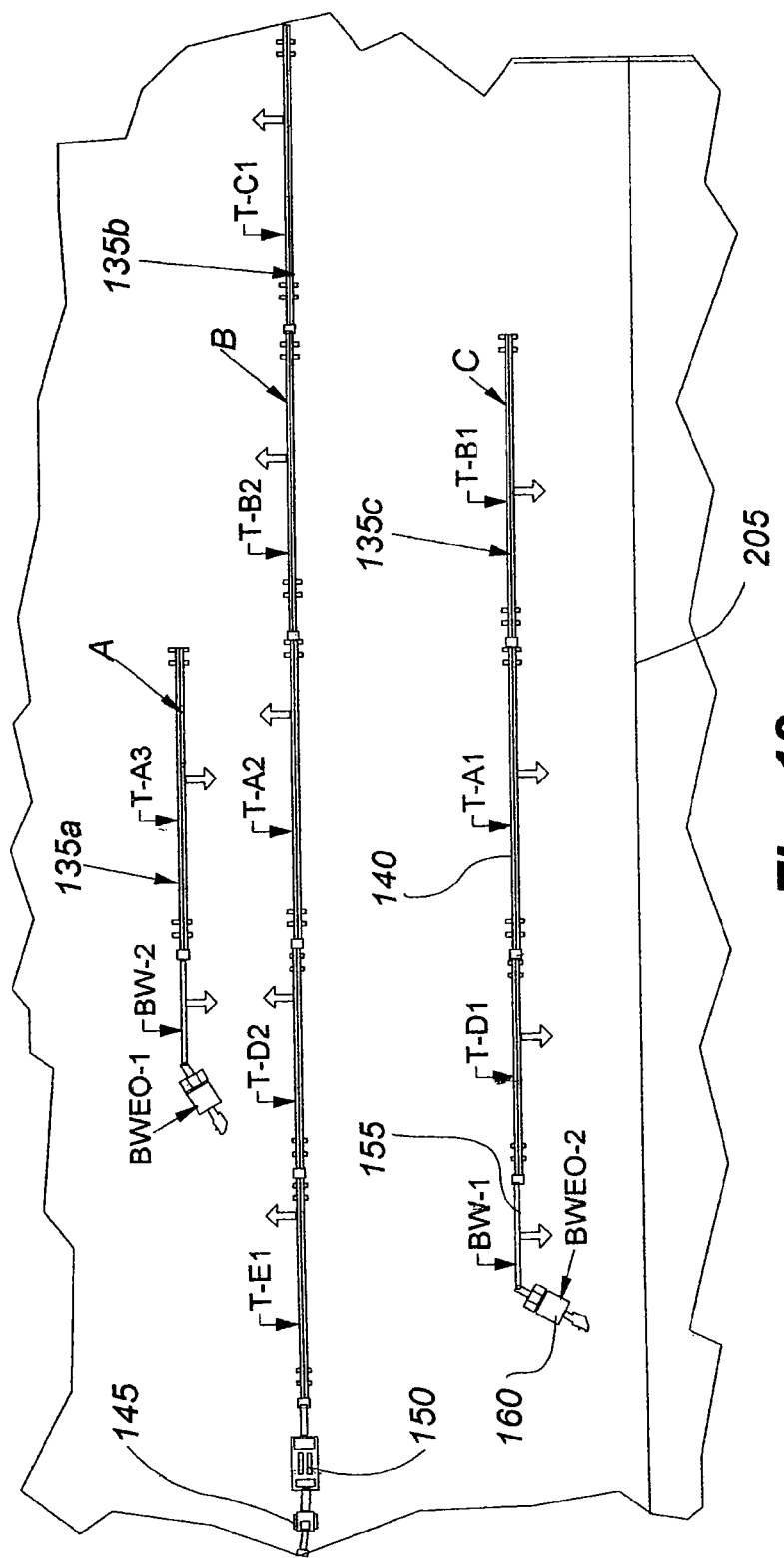

With reference to FIG. 9, each bridge conveyor line 135*a-c* is moving towards the same end wall 205. When bridge conveyor line C 135*c* reaches the end wall 205, it reverses direction and begins moving towards the opposite end wall 200 as shown in FIG. 10. Meanwhile, with reference to FIG. 10, bridge conveyor lines A and B 135*a-b* continue moving towards the end wall 205. Thus, bridge conveyor line C 135*c* moves towards bridge conveyor line B 135*b*. When bridge conveyor lines B and C 135*b-c* are near each other, a swapping operation (which may also be referred to as a switching operation) occurs. Specifically, with reference to FIGS. 10 and 11, two mobile bridge conveyors T-E1 and T-C1 140, the shovel 145, and the mobile crusher 150 are removed from bridge conveyor line C 135*c* and added to bridge conveyor line B 135*b*. Meanwhile, bucket wheel excavator BWEO-2 160 and mobile transfer conveyor BW-1 155 are removed from bridge conveyor line B 135*b* and added to bridge conveyor line C 135*c*. After completion of the equipment swap, bridge conveyor line C 135*c* reverses direction and heads towards the end wall 205, while bridge conveyor line B 135*b* also reverses direction and begins heading towards the opposite end wall 200. Meanwhile, bridge conveyor line A 135*a* continues to head towards the end wall 205, thus resulting in bridge conveyor line B 135*b* moving towards bridge conveyor line A 135*a* as shown in FIGS. 11 and 12.

Figure 13:
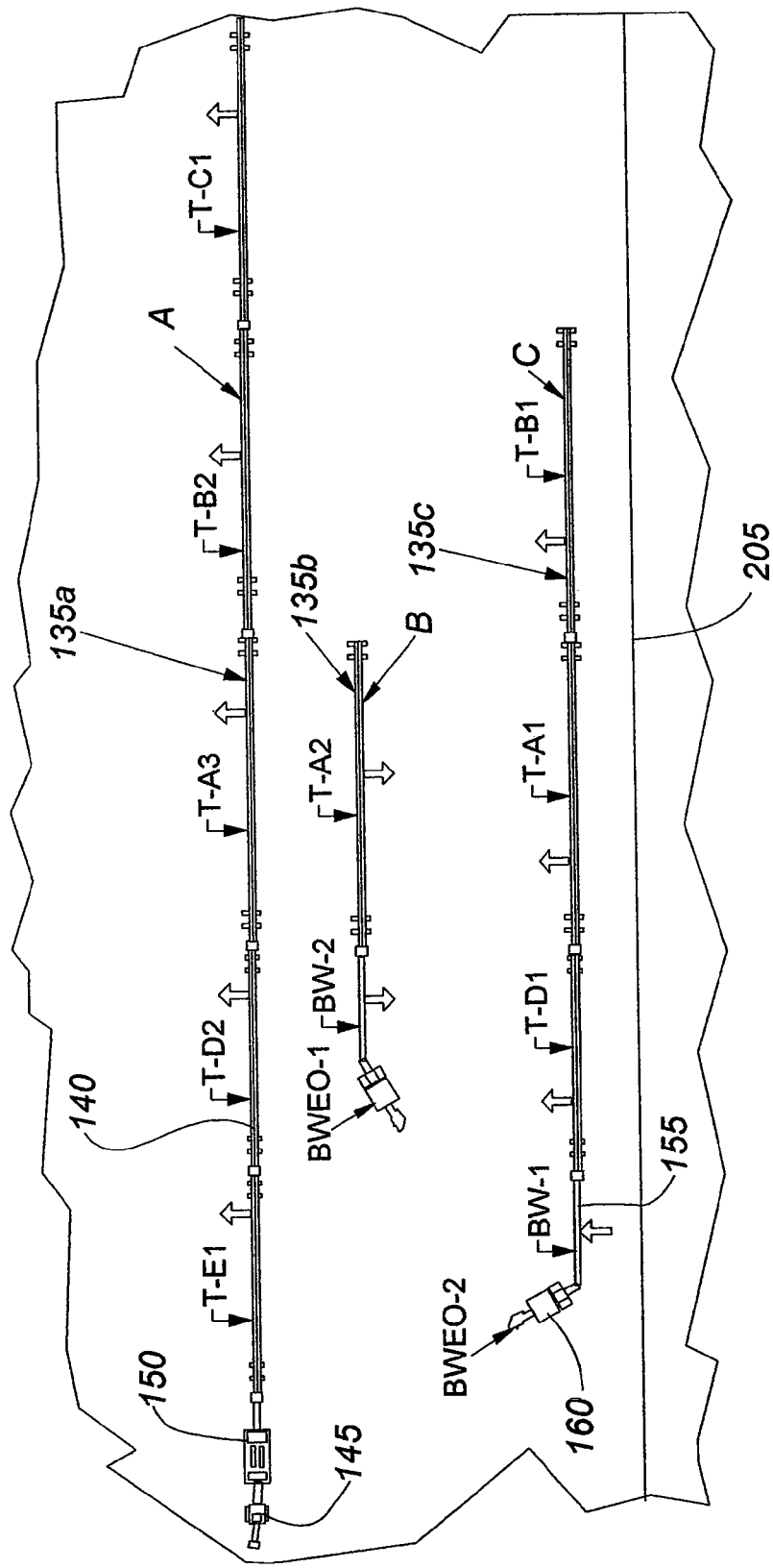

When bridge conveyor lines A and B 135*a-b* are proximate to each other, another swapping operation occurs. With reference to FIGS. 12 and 13, four mobile bridge conveyors T-E1, T-D2, T-B2 and T-E1 140, the shovel 145, and the mobile crusher 150 are removed from bridge conveyor line B 135*b* and added to bridge conveyor line A 135*a*. Additionally, the bucket wheel excavator BWEO-1 160 and the mobile transfer conveyor BW-2 155 are removed from bridge conveyor line A 135*a* and added to bridge conveyor line B 135*b*. Bridge conveyor lines A and B 135*a-b* then each reverse direction with bridge conveyor line A 135*a* moving towards the opposite end wall 200 and bridge conveyor line B 135*b* moving towards the end wall 205. Further, upon reaching the end wall 205, bridge conveyor line C 135*c* reverses direction as shown in FIG. 13 and moves towards the opposite end wall 200, thus resulting in bridge conveyor lines B and C 135*b-c* moving towards each other.

Figure 14:
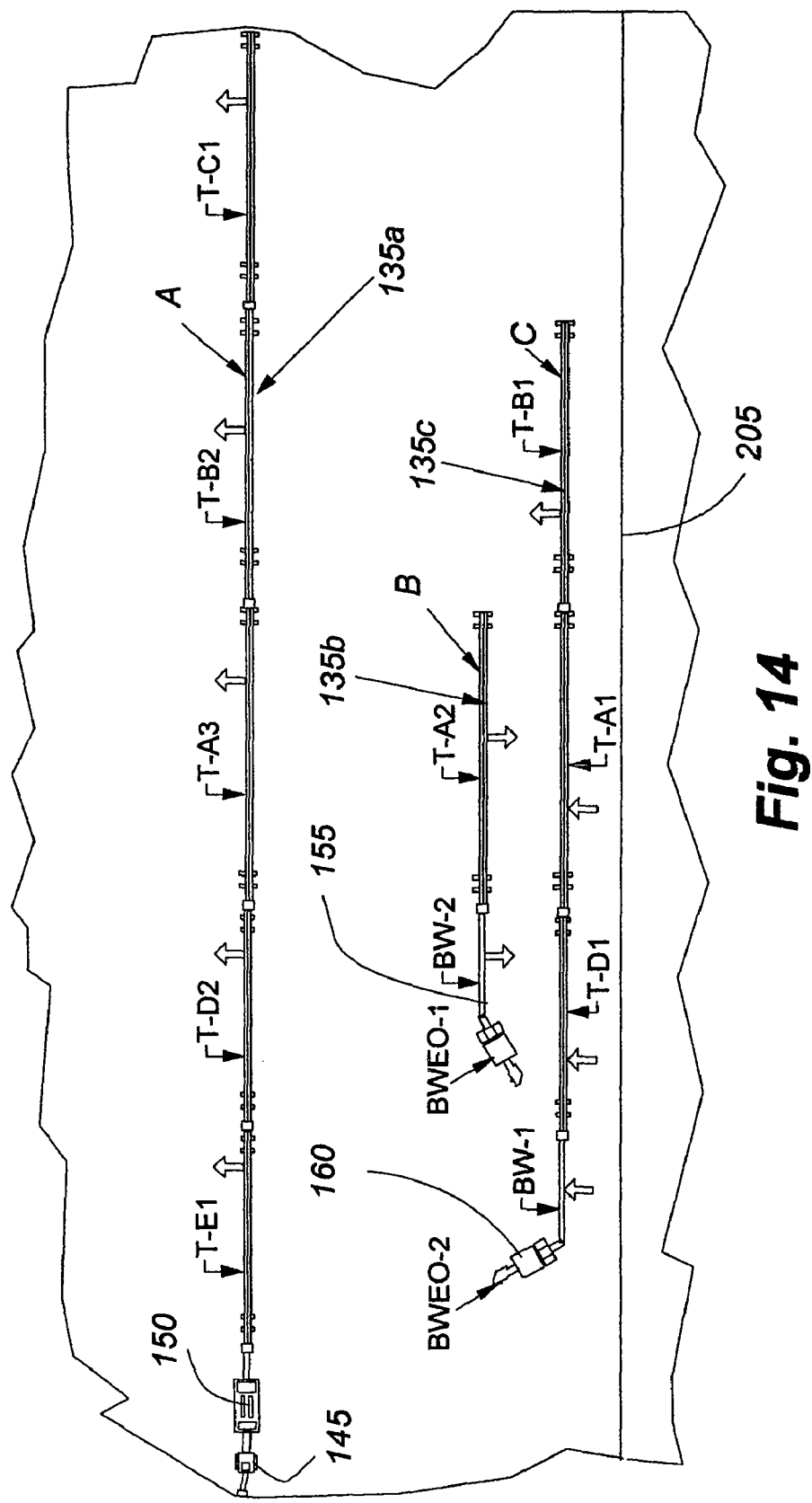
Figure 15:
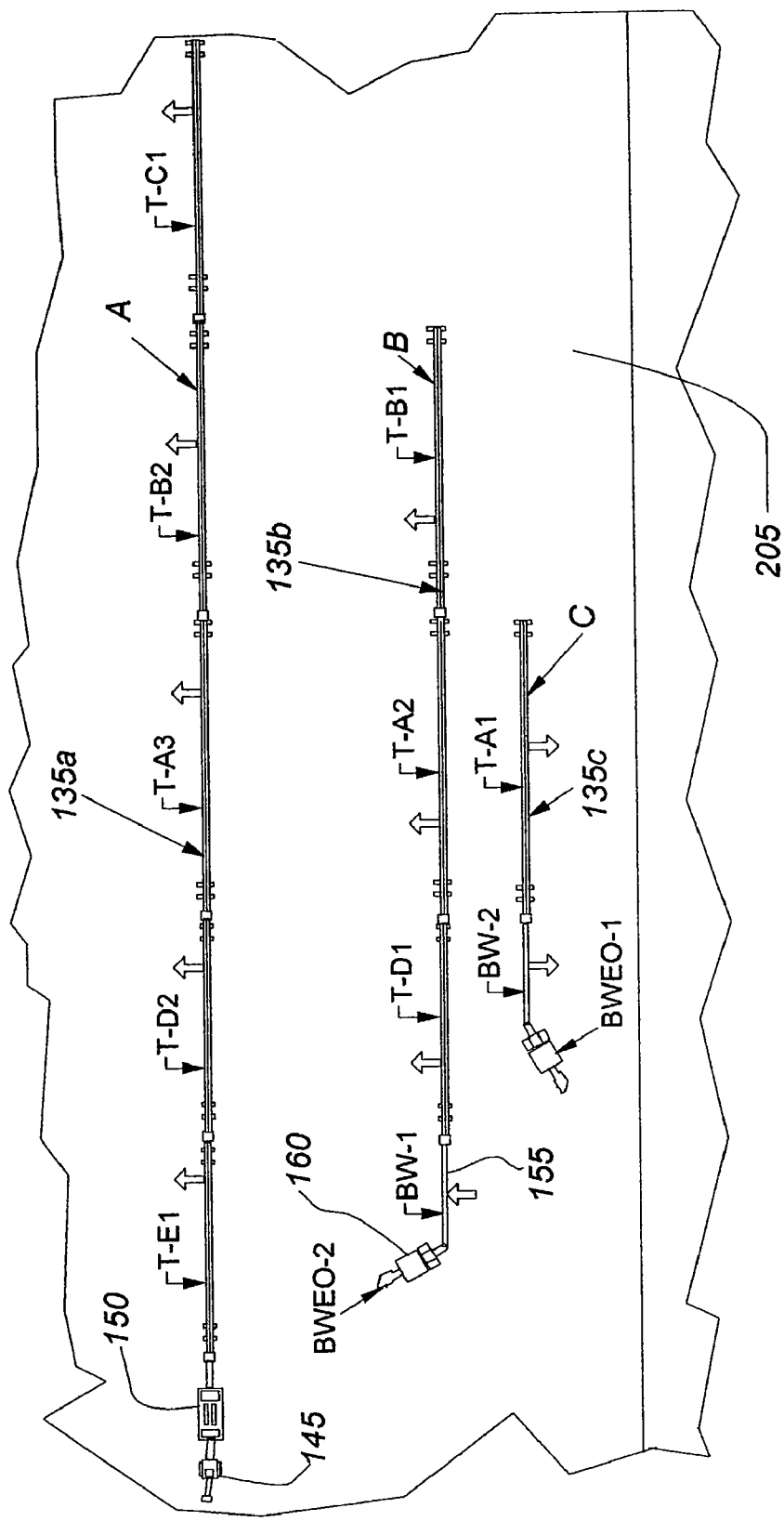

When bridge conveyor lines B and C 135*b-c* are proximate to each other, yet another swapping operation occurs. With reference to FIGS. 14 and 15, two mobile bridge conveyors T-D1 and T-B1 140, the bucket wheel excavator BWEO-2 160, and the mobile transfer conveyor BW-1 155 are removed from bridge conveyor line C 135*c* and added to bridge conveyor line B 135*b*. Meanwhile, the bucket wheel excavator BWEO-1 160 and the mobile transfer conveyor BW-2 155 are removed from bridge conveyor line B 135*b* and added to bridge conveyor line C 135*c*. After completion of the swap, bridge conveyor lines B and C 135*b-c* each reverse direction with bridge conveyor line B 135*b* moving towards the opposite end wall 200 and bridge conveyor line C 135*c* moving toward the end wall 205.

Figure 16:
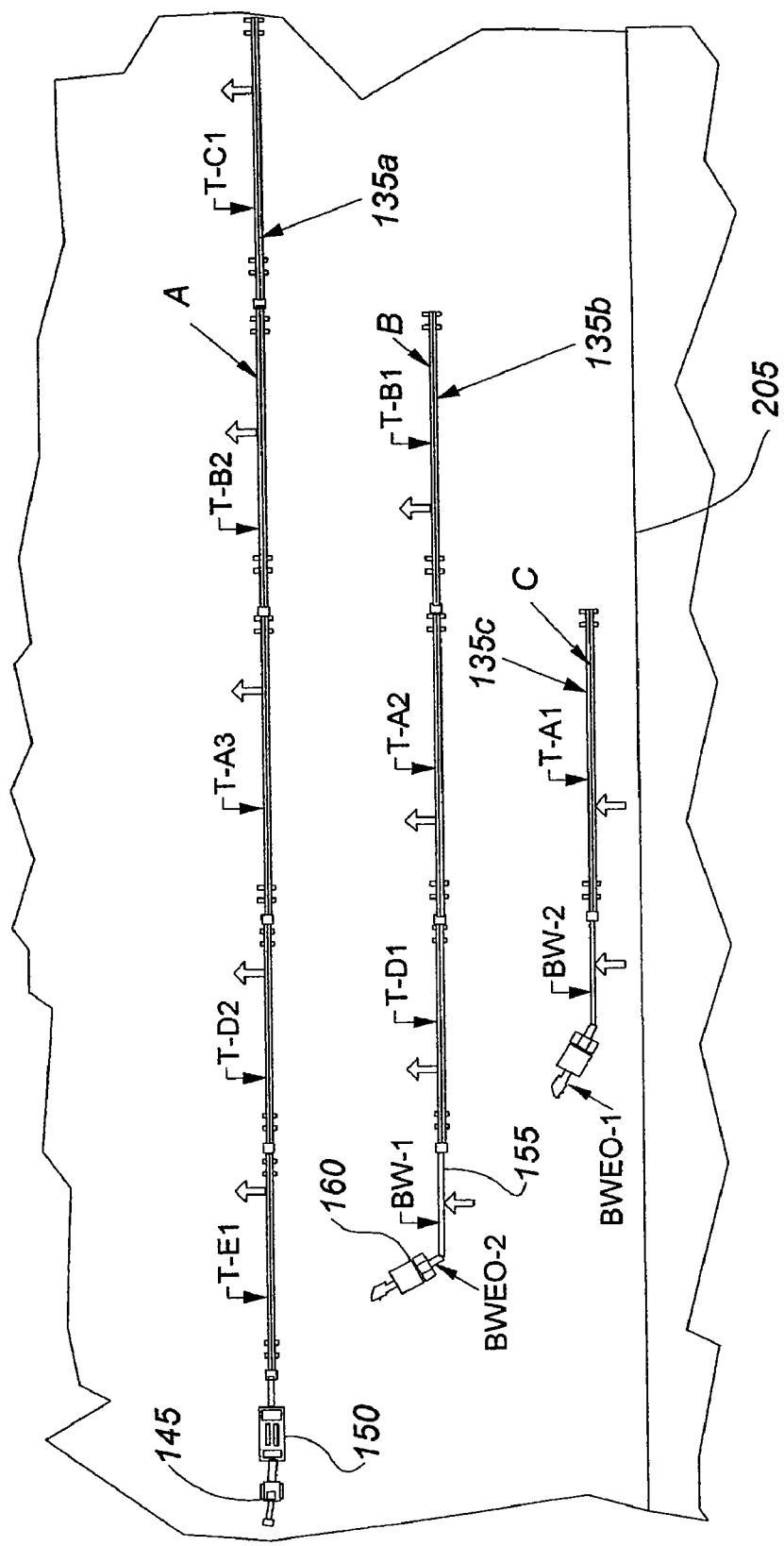

With reference to FIG. 16, once bridge conveyor line C 135*c* reaches the end wall 205, it reverses direction and moves towards the opposite end wall 200. As shown in FIG. 16, all three bridge conveyor lines A, B, and C 135*a-c* are now moving towards the opposite end wall 200 once bridge conveyor line C 135*c* reverses direction. When bridge conveyor line A 135*a* reaches the opposite end wall 200, a similar swapping operation occurs as described above until all three bridge conveyor lines 135*a-c* are once again traveling towards the original end wall 205. Further, although three bridge conveyor lines 135*a-c* are shown in FIGS. 9-16, similar swapping operations could be done for two, or more than three, bridge conveyor lines. In other words, when the mobile conveyor lines approach an end wall, excavation equipment, intermediary mobile transfer conveyors or the like, and mobile bridge conveyors are exchanged between mobile conveyor lines 135*a-c* as the mobile conveyor lines approach each other until all of the mobile conveyor lines 135*a-c* are moving towards the opposite end wall.

Returning to FIG. 1, as the bridge conveyor lines A-C 135*a-c* move between the end walls 200, 205 and towards the overburden side 110 of the mine 100, a coal seam 125 or other material of interest is exposed. Coal from the coal seam 125 may be removed and transported to a storage location using any suitable coal removal and transportation method or system. For example, bucket wheel excavators 160, as shown in FIG. 1, may excavate coal from the coal seam 125 and deposit it on conveyors, such as mobile vertical conveyors 215, shiftable conveyors 220 and overland conveyors 225, for transportation to a storage location, such as storage silos or the like. Although FIG. 1 shows the coal as removed by bucket wheel excavators 160 and transported by conveyors, any other open pit mining excavation and transportation system may be used, including, but not limited to, shovel and truck systems.

Figure 17:
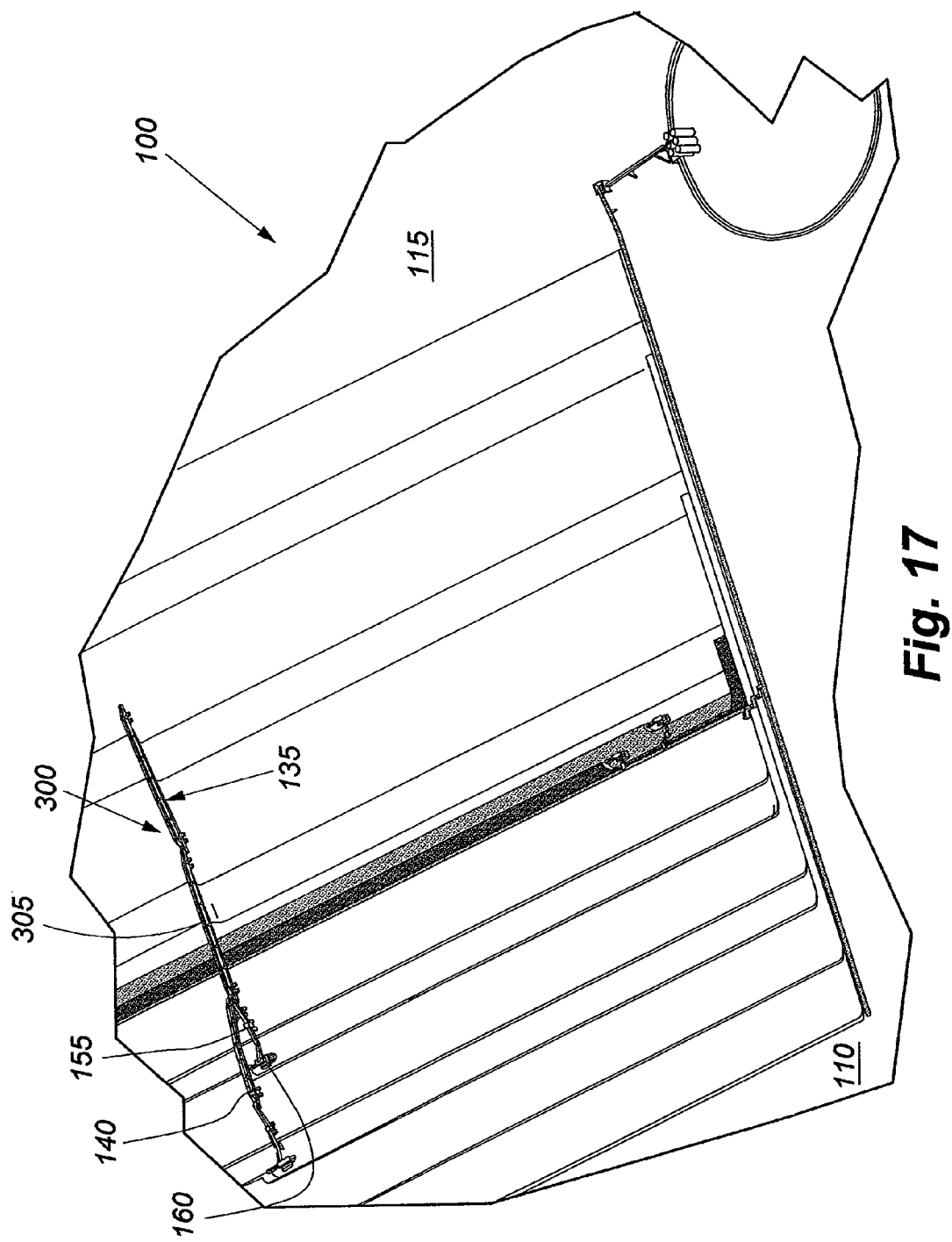
FIG. 17 shows a schematic isometric view an open mining pit showing another possible conveyor system for transporting material from an overburden side to a stack side of the mine.

FIG. 17 is an isometric view of an open pit mine 100 showing another possible conveyor system 300 for transporting material from one location to another location of the mine 100. Like the conveyor system 105 shown in FIG. 1, the conveyor system 300 shown in FIG. 17 may use one or more mobile bridge conveyor lines 135 to transport excavated material from one location of the mine 100 to another location. Further, like the conveyor system 105 shown in FIG. 1, excavation equipment, such as bucket wheel excavators 160, may transfer removed material to mobile transfer conveyors 155 or the like, which in turn transfer the excavated material to a conveyor supported by a mobile bridge conveyor 140.

However, like the conveyor system 105 shown in FIG. 1, the material could be transferred directly from the excavation equipment to conveyors on the mobile bridge conveyors 140 or may be transferred using other equipment, such as mobile crushers.

The second conveyor system 300 differs from the conveyor system 105 shown in FIG. 1 in that the bridge structure 175 for a central mobile bridge conveyor 305 supports two conveyors 310, 315 for transporting material along the mobile bridge conveyors 305 rather than one conveyor. Turning to FIGS. 18-24, the central mobile bridge conveyor 305 may include an upper conveyor 310 and a lower conveyor 315. The upper conveyor 310 may be supported above the lower conveyor 315 by the bridge structure 175 of the central mobile bridge conveyor 305. Returning to FIG. 17, the upper conveyor 310 may receive excavated material from a level of the mine 100 higher than a level of the mine 100 from which excavated material is delivered to the lower conveyor 315.

With reference to FIGS. 18-24, the central mobile bridge conveyor 305 may include a shuttle conveyor 320. Like the shuttle conveyor 185 shown in FIGS. 5-8, the shuttle conveyor 320 for the central mobile bridge conveyor 305 may be selectively moved in its axial direction relative to the crawler 180 that supports the central mobile bridge conveyor 305. Also like the shuttle conveyor 185 shown in FIGS. 5-8, the belt 325 of the shuttle conveyor 320 may move material from the right to the left end of the shuttle conveyor 320, or vice versa. Further, the shuttle conveyor 320 for the central mobile conveyor 305 may be selectively pivoted relative to the crawler 180.

Figure 18:
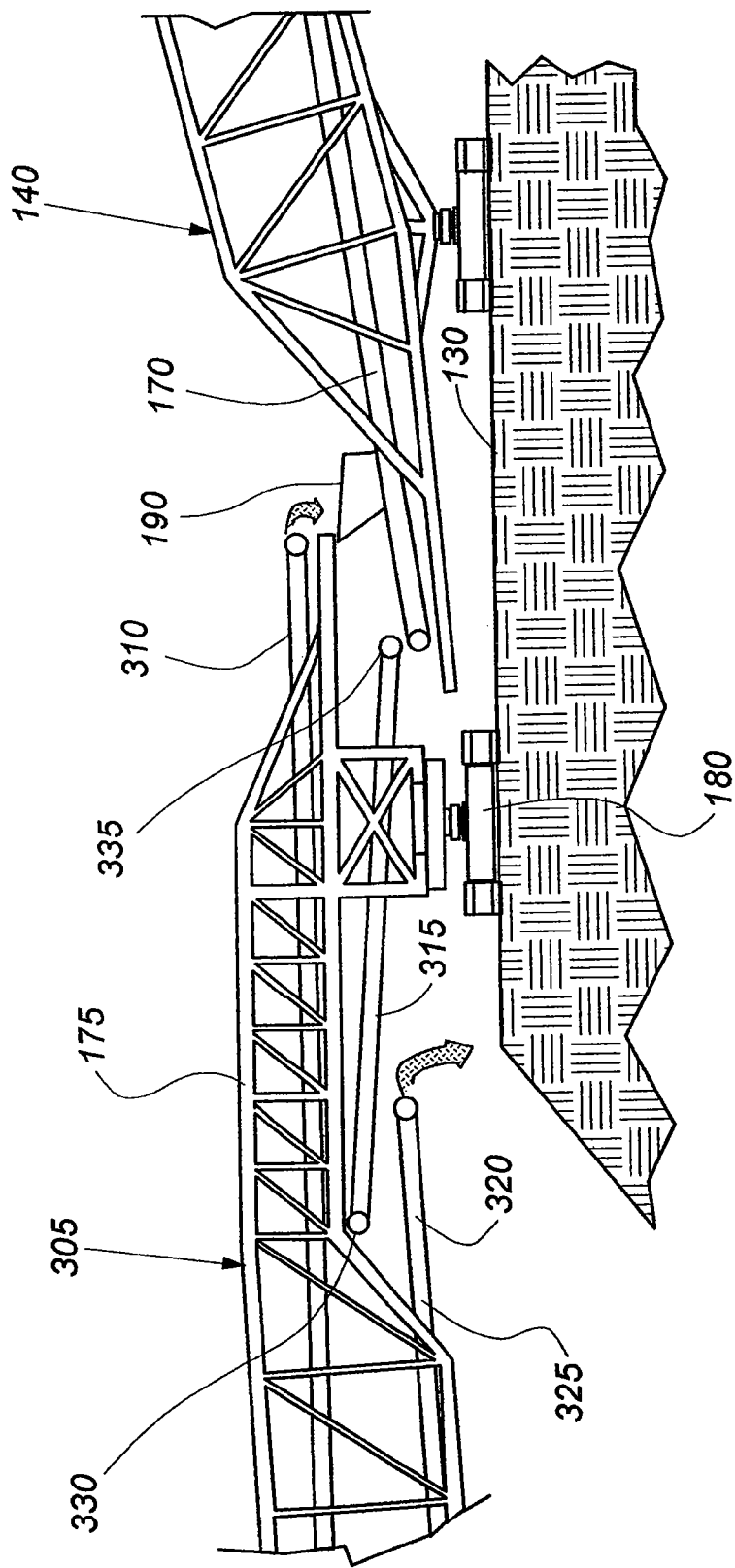
FIG. 18 shows a schematic elevation view of end portions of two mobile bridge conveyors for use in the conveyor system shown in FIG. 17.

FIG. 18 shows the shuttle conveyor 320 positioned such that its ends 330, 335 are moved leftward relative to the crawler 180, its left end 330 is positioned in an upper position, and its right end 335 is positioned in a lower position relative to the crawler 180. In this position, material transported on the upper conveyor 310 may be transferred to a conveyor 170 of an adjacent mobile bridge conveyor 140 for transportation to a higher level of the mine 100. The material from the upper conveyor 310 may be deposited into a hopper 190 of the adjacent mobile bridge conveyor 140. From the hopper 190, the material may be deposited onto a conveyor 170 of the adjacent mobile bridge conveyor 140. As described above, the hopper 190 may be omitted, if desired. Additionally, when the shuttle conveyor 320 of the central mobile bridge conveyor 305 is moved to the position shown in FIG. 18, excavated material transported by the lower conveyor 315 may be deposited proximate an end portion of the stack bench 130 supporting the central mobile bridge conveyor 305.

Figure 19:
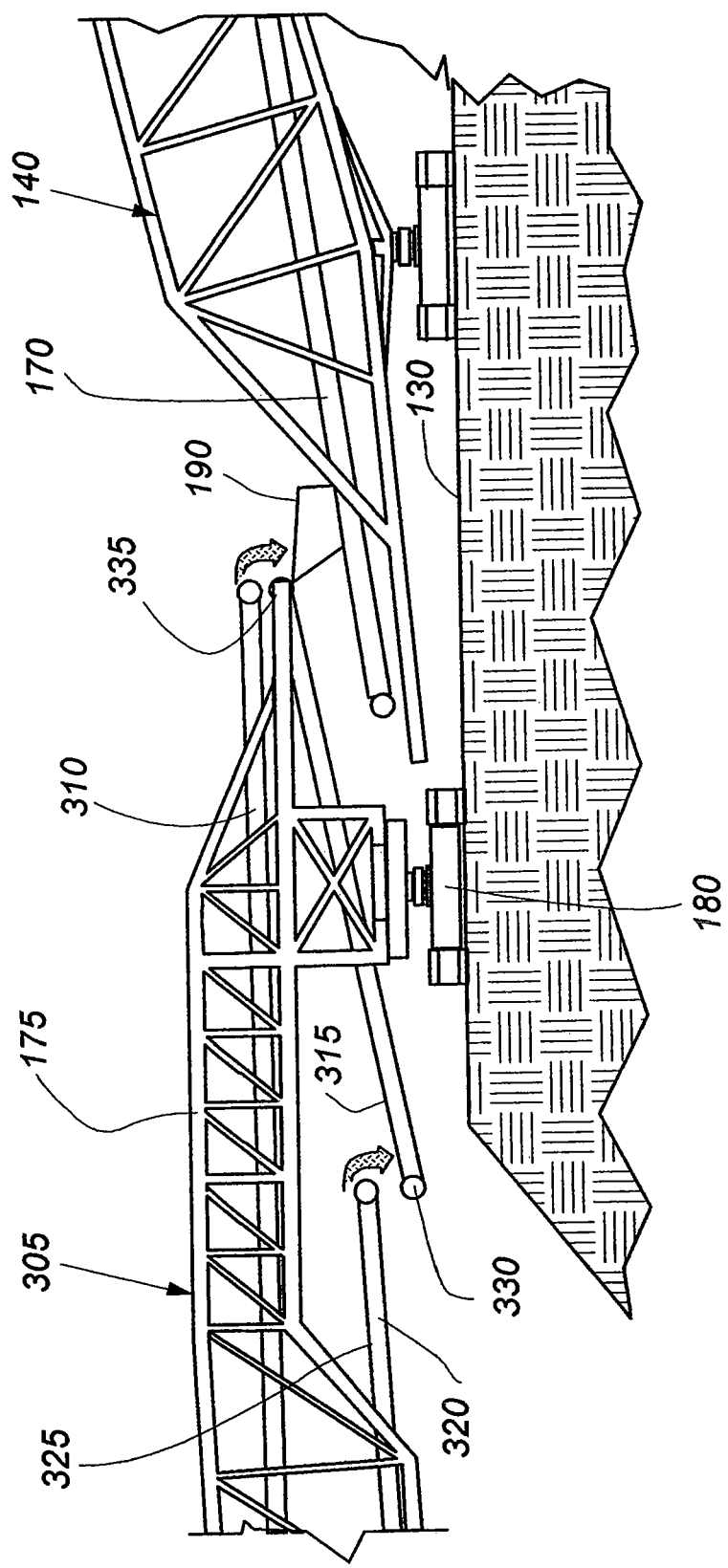
FIG. 19 shows another schematic elevation view of end portions of two mobile bridge conveyors for use in the conveyor system shown in FIG. 17.

FIG. 19 shows the shuttle conveyor 320 positioned with its ends 330, 335 more to the right relative to the crawler 180 than shown in FIG. 18, with the right end 335 positioned in an upper position relative to the crawler 180 and the left end 330 positioned in a lower position relative to the crawler 180. In this configuration for the shuttle conveyor 320, excavated material from the lower conveyor 315 may be transferred to the shuttle conveyor 320. The shuttle conveyor 320 may then transfer the material to the conveyor 170 on the adjacent mobile bridge conveyor 140 for transportation to a higher level of the mine 100.

Figure 20:
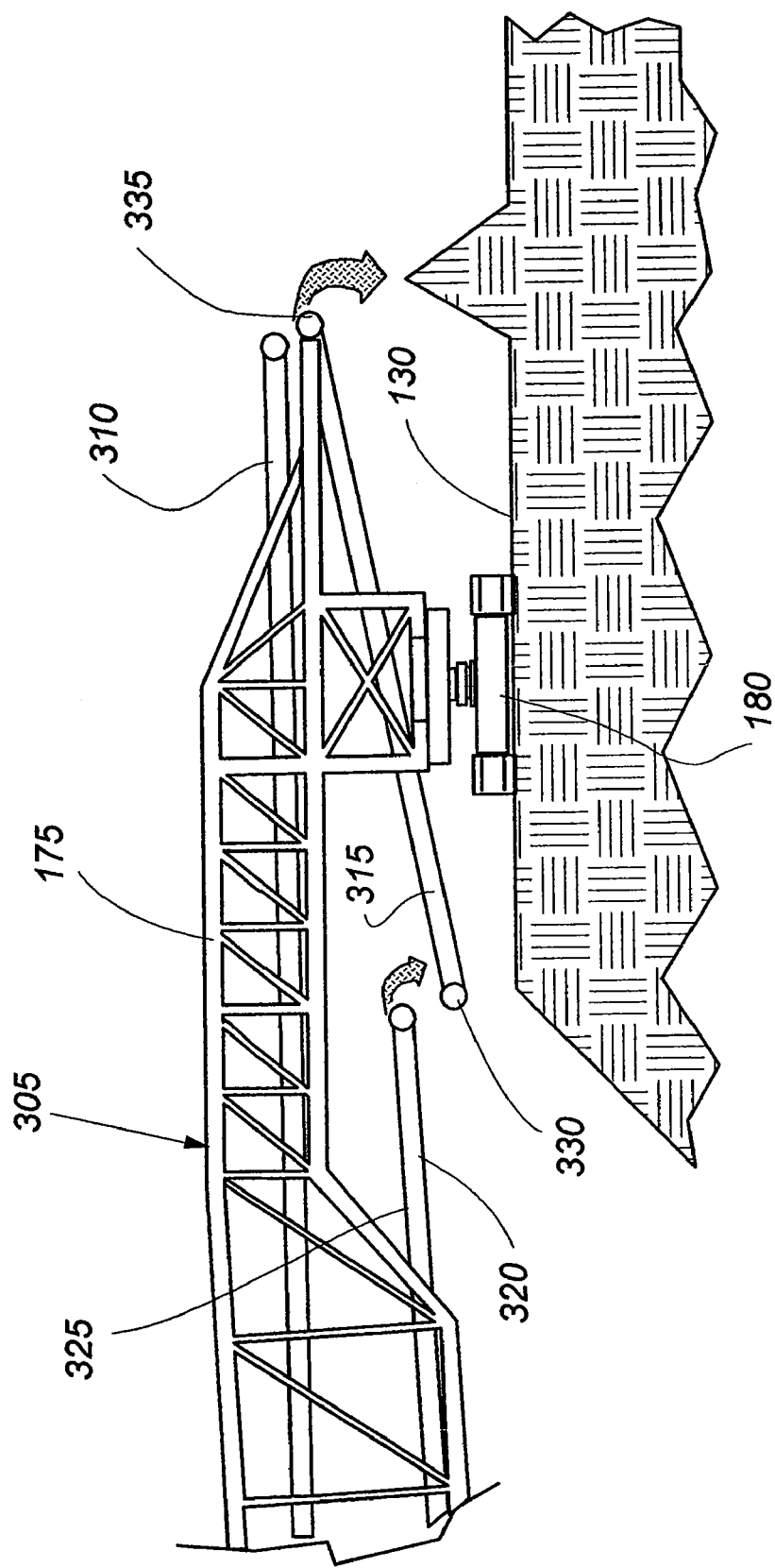
FIG. 20 shows a schematic elevation view of an end portion of a mobile bridge conveyor for use in the conveyor system shown in FIG. 17.
Figure 21:
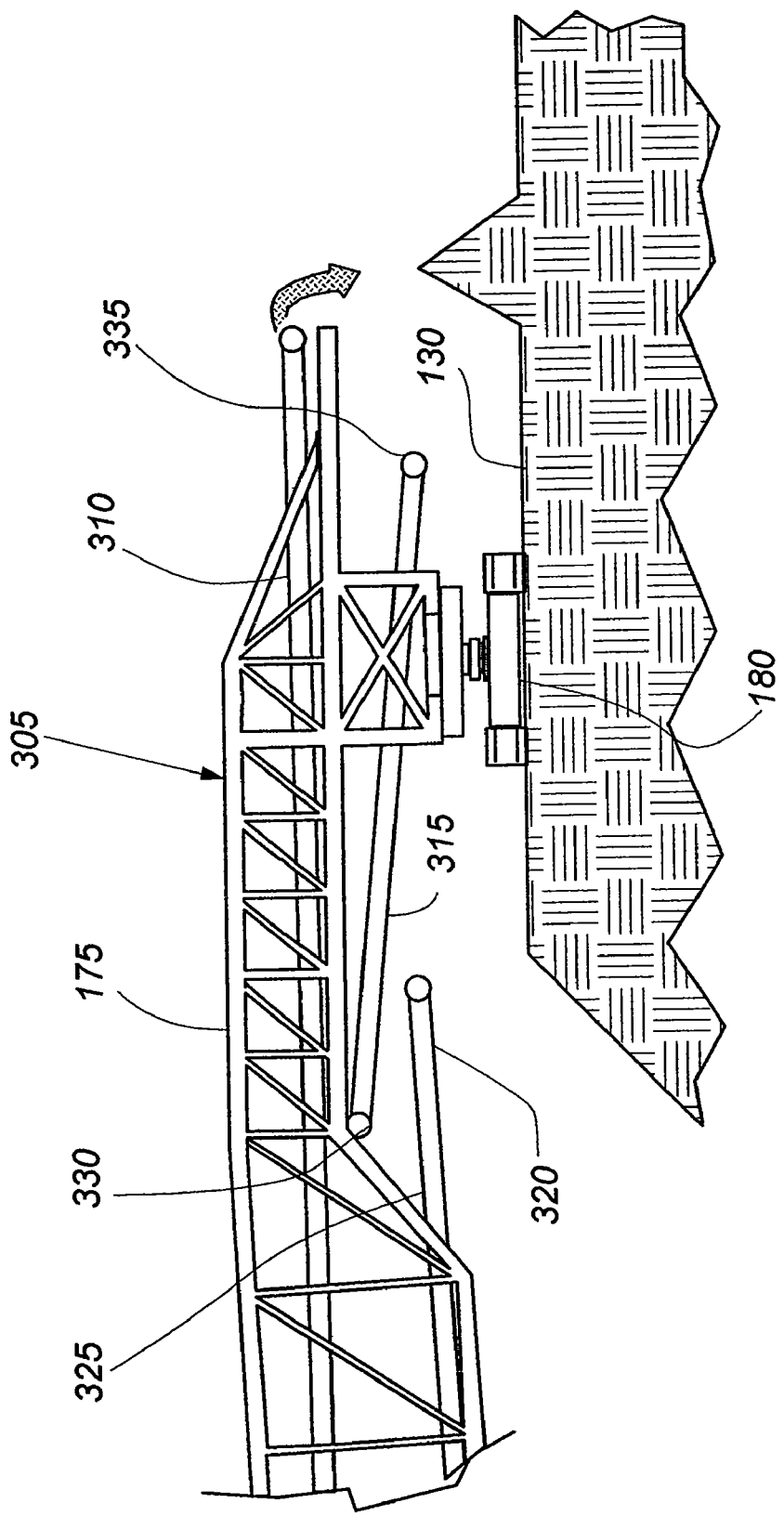
FIG. 21 shows a schematic elevation view similar to the view shown in FIG. 20.

FIG. 20 shows the shuttle conveyor 320 in a position similar to the one shown in FIG. 19. However, the adjacent mobile bridge conveyor 140 is removed. Thus, material transferred to the shuttle conveyor 320 from the lower conveyor 315 is deposited onto the stack bench 130 supporting the central mobile bridge conveyor 305 at a location away from the end portion of this stack bench 130. FIG. 21 shows the shuttle conveyor 320 in a position similar to the one shown in FIG. 18. Like FIG. 20, the adjacent mobile bridge conveyor 140 is not present. Thus, material transferred to the shuttle conveyor 320 from the upper conveyor 310 is deposited onto the stack bench 130 supporting the central mobile bridge conveyor 305 at a location away from the end portion of this stack bench 130.

Figure 22:
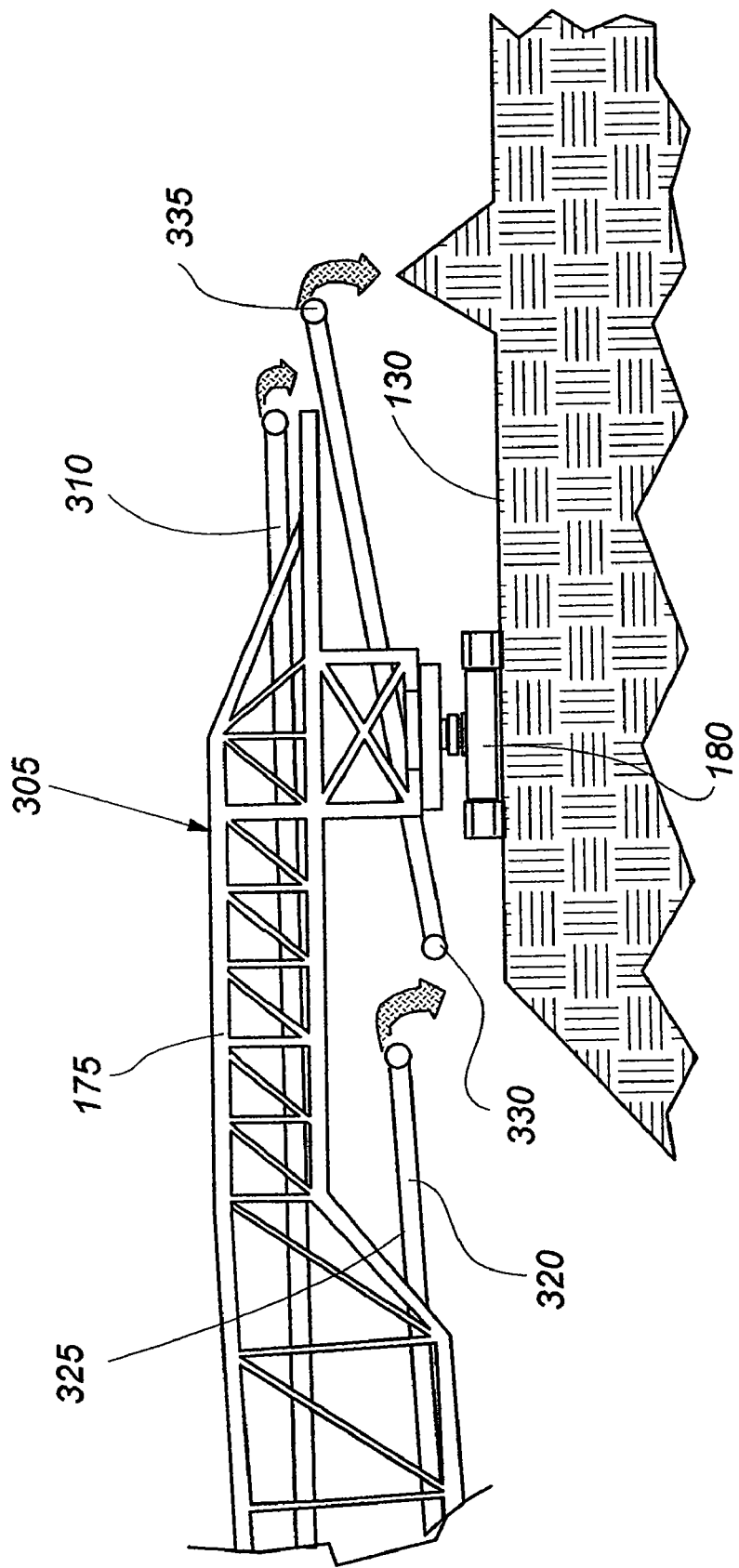
FIG. 22 shows a schematic elevation view similar to the view shown in FIG. 20.
Figure 23:
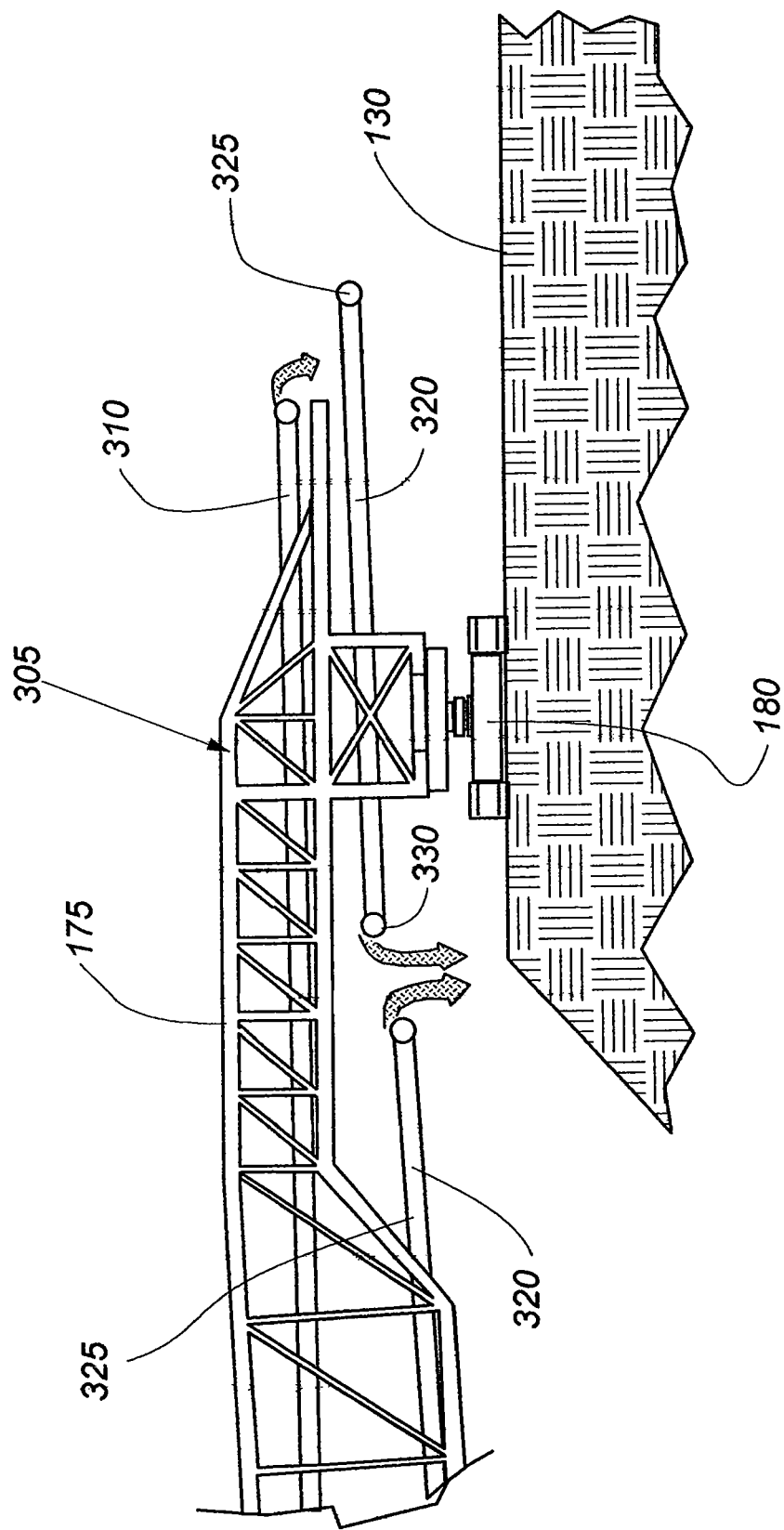
FIG. 23 shows a schematic elevation view similar to the view shown in FIG. 20.

FIG. 22 is similar to FIG. 21 except it shows the shuttle conveyor 320 in its rightmost position relative to the crawler 180. In this shuttle conveyor position, material from the upper conveyor 310 may be delivered onto the stack bench 130 at a distance further from the crawler 180 than the distance shown in FIG. 21. FIG. 23 is similar to FIG. 22 except the direction of belt travel for the shuttle conveyor 320 is reversed. In this configuration, material from the upper and lower conveyors 310, 315 can be deposited proximate an end portion of the stack bench 130.

Figure 24:
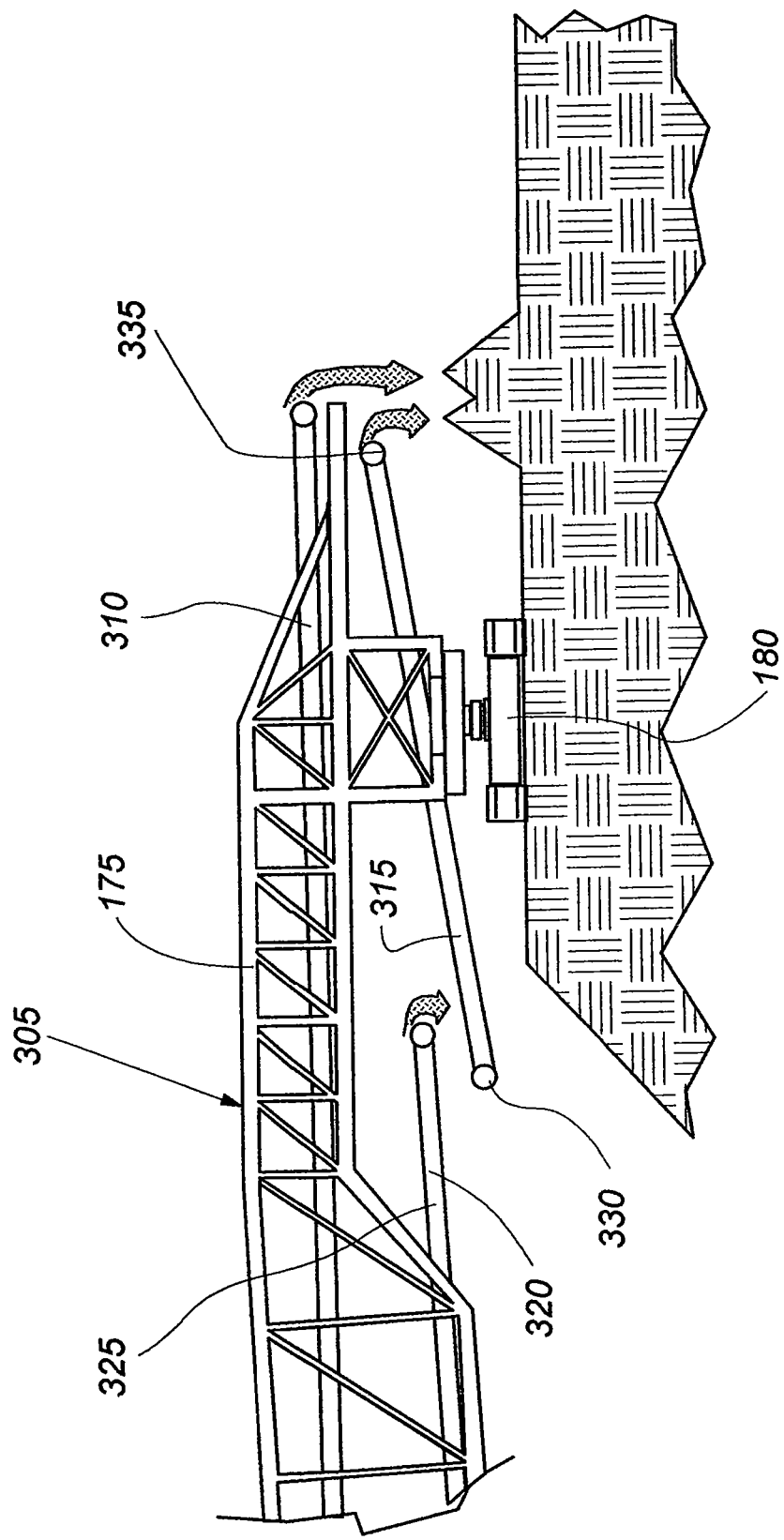
FIG. 24 shows a schematic elevation view similar to the view shown in FIG. 20.

FIG. 24 shows the shuttle conveyor 320 in its leftmost positioned relative to the crawler 180 with its left end 330 positioned down relative to the crawler 180 and its right end 335 positioned up relative to the crawler 180. In this position, material from the upper and lower conveyors 310, 315 may simultaneously be deposited at a location on the stack bench 130 away from the end portion of the stack bench 130.

As with the shuttle conveyor 185 shown and described in FIGS. 5-8, these examples for the shuttle conveyor 320 shown in FIGS. 18-24 demonstrate that the position of the shuttle conveyor 320 relative to the crawler 180 and the position of the crawler 180 on a bench, or the top surface of the mine 100, allows for material to deposited at desired locations within the mine 100. Further, the ability to move the shuttle conveyor 320 relative to the crawler 180 allows for material to be deposited at different locations on a bench, or the top surface of the mine 100, without moving the crawler 180 transverse to the main direction of travel of the mobile bridge conveyor 305. Yet further, the ability to discharge material from either end 330, 335 of the shuttle conveyor 320 further allows material to be deposited at different locations on a bench, or the top surface of the mine 100, without moving the crawler 180 transverse to its main direction of travel.

Similar to the bridge conveyor lines 135a-c of the conveyor system 105 shown in FIG. 1, the bridge conveyor line 135 shown in FIG. 17 moves back and forth between the end walls 200, 205 of the mine 100 and towards the overburden side 110. As the second conveyor system 300 progresses, material is removed from the overburden side 110 and deposited on the stack side 115 of the mine 100. Also, like the conveyor system 105 shown in FIG. 1, coal may be removed from the exposed coal seam 125 and transferred to a storage location using any suitable excavation and transportation system.

FIGS. 25-31 and 33 show various view of an open pit mine 100 with a third possible conveyor system 400. Like the conveyor systems 105, 300 shown in FIGS. 1 and 17, the conveyor system 400 shown in FIGS. 25-31 and 33 may use one or more bridge conveyor lines 135a-c to transport excavated material from one location to another location in the mine 100. Further, like the conveyor systems 105, 300 shown in FIGS. 1 and 17, excavation equipment, such as bucket wheel excavators or shovels, may transfer removed material to mobile transfer conveyors or the like, which in turn transfer the excavated material to conveyors supported by a mobile bridge conveyors. However, like the conveyor systems 105, 300 shown in FIGS. 1 and 17, the material could be transferred directly from the excavation equipment to conveyors on the mobile bridge conveyors, or may be transferred using other equipment, such as mobile crushers. Yet further, like the conveyor system 105 shown in FIG. 1, the bridge conveyor lines 135a-c shown in FIGS. 25 and 33 move back and forth between the end walls 200, 205 of the mine 100 and towards the overburden side 100 with mobile conveyors, excavation equipment and other equipment being switched in a manner similar to the manner described above for the first conveyor system 105. As the equipment progresses in the mine 100, material is removed from the overburden side 110 and deposited on the stack side 115 of the mine 100.

While the third conveyor system 400 is similar to the first conveyor system 105 shown in FIGS. 1-8 and operates in a similar manner, there are differences between the systems. For example, with reference to FIGS. 25-30, the mobile bridge conveyors 405 of the third conveyor system 400 differ from those of the first conveyor system 105. Specifically, the mobile bridge conveyors 405 have cantilevered at one end. In other words, one of the crawlers 410 is moved towards the center of the mobile bridge conveyor 405 from one end of the mobile conveyor bridge 405 at a distance of approximately one-third or so of the length of the mobile bridge conveyor 405. Typically, the crawler 410 at the discharge end 415 of the mobile bridge conveyor 405 is moved inward such that the bridge structure 420 cantilevers from the crawler 410 that supports the bridge structure 420 at this end of the mobile bridge conveyor 405.

Because one end of the mobile bridge conveyor 405 is cantilevered, each bench 120, 130 supports one crawler 410 for a mobile bridge conveyor 405 within a given bridge conveyor line 135a-c rather than two as at some locations for the bridge conveyor lines 135a-c of the system 105 shown in FIGS. 1-8. By limiting the number of crawlers 410 to one per bench 120, 130 for a given bridge conveyor line 135a-c, additional space is available on the bench 120, 130 for the passage of other equipment near the mobile bridge conveyor 405. Also, by keeping the number of crawlers 410 to one rather than two, the number of mobile bridge conveyors 405 damaged by failure of a bench 120, 130 will typically be reduced.

Further, the cantilever arrangement for the mobile bridge conveyors 405 reduces the maximum unsupported length of bridge structures 420 of the mobile bridge conveyors 405 compared to the bridge structures 175 of the end supported conveyors 140 shown in FIGS. 1-8. Because of this reduction in the unsupported length, smaller trusses 425 can generally be used to form the bridge structure 420 of a mobile bridge conveyor 405 compared to the trusses required for the end supported mobile bridge conveyors 140. Since smaller trusses 425 can be used, the overall weight of the mobile bridge conveyor 405 is generally lower than for a comparable end supported bridge conveyor 140, which allows for the potential to increase conveyor capacity as more load can be carried by a lighter structure for a given bench maximum support load. Additionally, smaller trusses 425 make it easier to obtain desired material, such as cold-weather steel, for constructing the mobile bridge conveyors 405, make it easier to inspect welds since smaller welds can be used, allow for trusses 425 to be constructed off-site since the trusses 425 can be transported on highways, and make it easier to replace damaged trusses 425 with new trusses 425.

Figure 25:
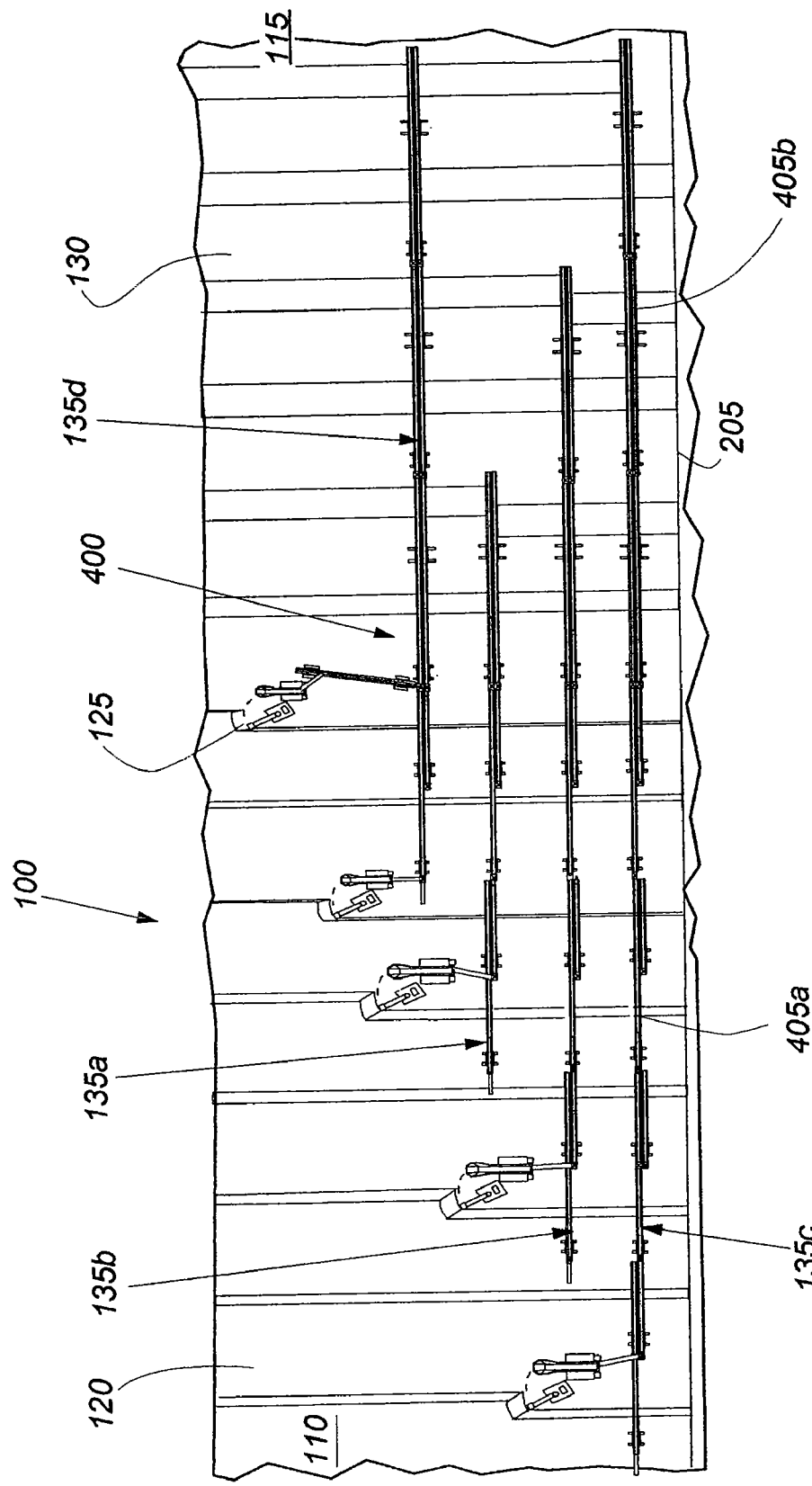
FIG. 25 shows a schematic plan view of an open mining pit showing a third possible conveyor system for transporting material from for transporting material from one area or location of the mine to another area or location.

The downhill (or overburden) side mobile bridge conveyors 405a of the third system 400 further differ from the downhill side mobile bridge conveyors 140 of the system 105 shown in FIGS. 1-8 in that they include a long conveyor 430 and a short conveyor 435. The long and short conveyors 430, 435 are arranged in a side-by-side configuration on the bridge structure 420 for the mobile bridge conveyor 405. Further, the long and short conveyors 430, 435 each include a receiving chute or hopper 440 mounted on a shuttle head that can extend from a retracted position (e.g., in some embodiments up to fifty feet from a retracted position), thus allowing either conveyor 430, 435 to be loaded as desired. For example, as shown in FIG. 25 the short conveyors 435 are loaded with excavated material, while as shown FIG. 26, the long conveyors 430 are loaded. When a short conveyor 435 is loaded, typically the mobile bridge conveyor 405 immediately downstream of the mobile bridge conveyor 405a that supports the loaded short conveyor 435 will be axially offset such that the long conveyor 430 of this downstream mobile bridge conveyor 405 aligns axially with the loaded short conveyor 435. This offset is shown, for example, in FIG. 25.

Providing two conveyors 430, 435 on the downhill mobile bridge conveyors 405a adds redundancy to the waste haulage conveyor lines because if a conveyor 430, 435 fails on a mobile bridge conveyor 405a, the mobile bridge conveyor 405 can often be exchanged for another mobile bridge conveyor 405a on the same bench until the conveyor 430, 435 can be repaired. Providing two conveyors 430, 435 on the downhill mobile bridge conveyors 405a also makes it possible to deal with coal seams 125 that appear on a bench 120 without requiring different equipment to transport the coal out of the pit. As for the use of shuttle heads, this helps to align the head pulleys of the conveyors 430, 435 with the loading chute 440, thus making it easier to align the mobile bridge conveyors 405a in each bridge conveyor line 135a-c.

Figure 27:
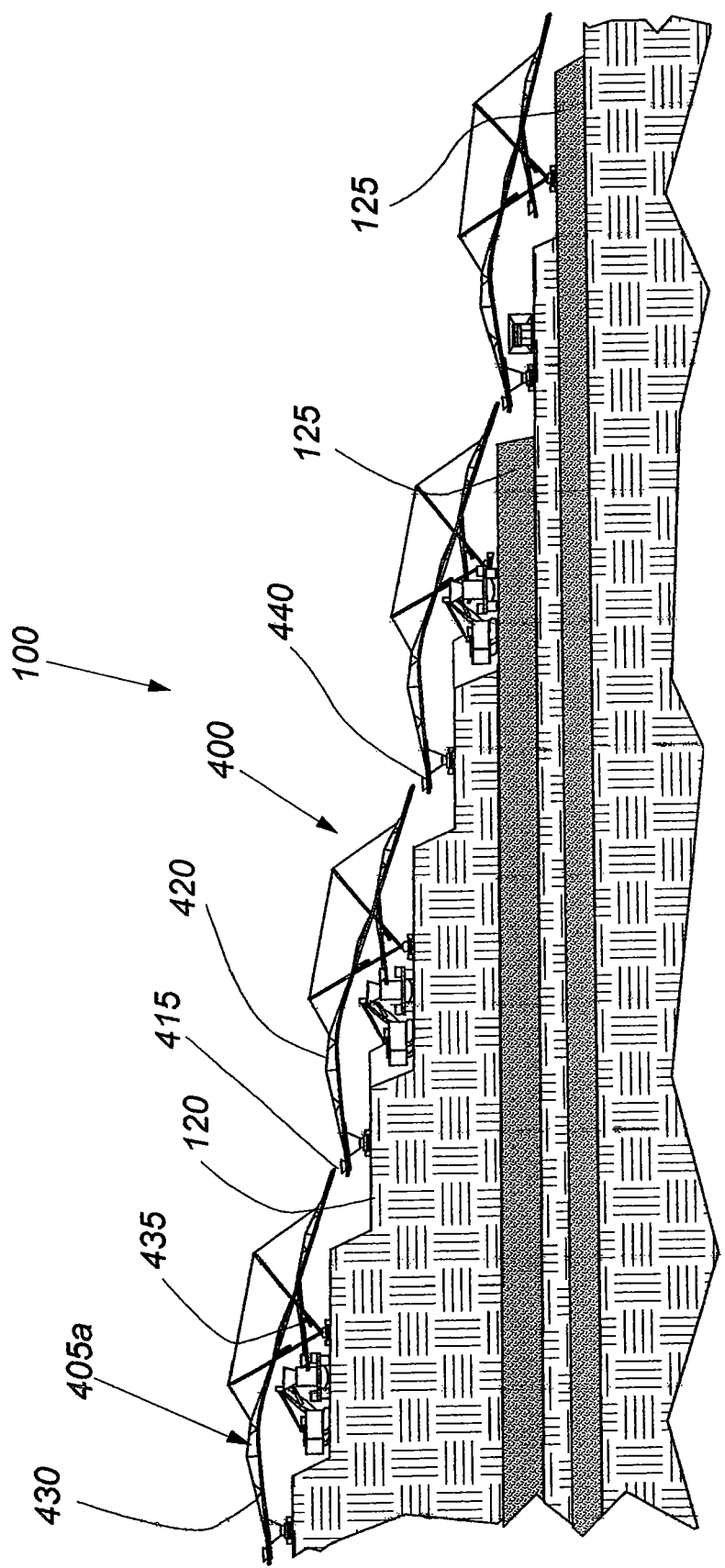
FIG. 27 shows a schematic elevation view of a downhill side of the open mining pit shown in FIG. 25.
Figure 29:
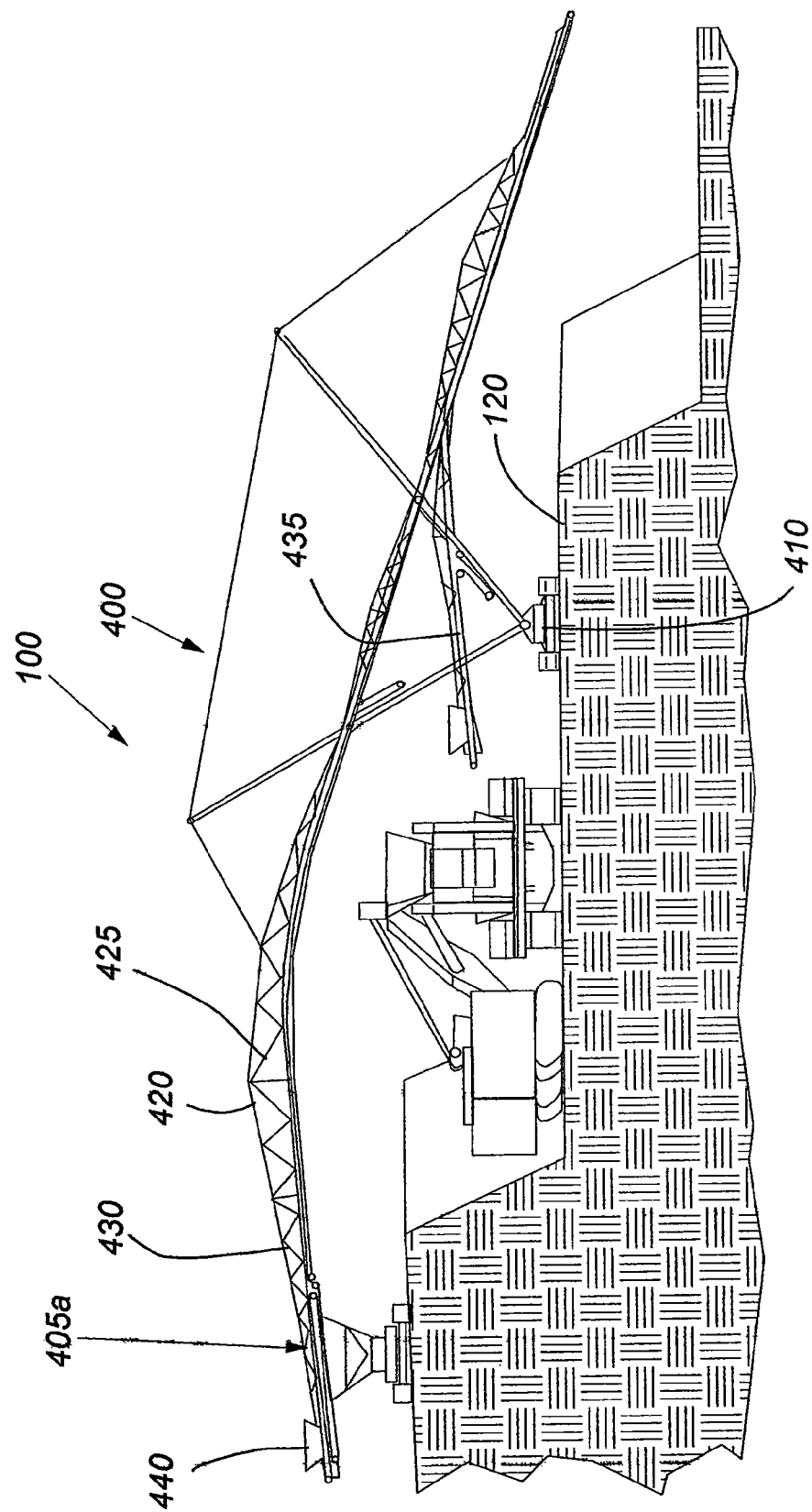
FIG. 29 shows a schematic elevation view of a portion of the uphill side of the open mining shown in FIG. 25.

With reference to FIGS. 27 and 29, the bridge structures for the downhill side mobile bridge conveyor 405a may be arched or otherwise curved in some embodiments. Such arching allows for the passage of haul trucks under the conveyors 430, 435 on the benches 120 that support the mobile bridge conveyors 405a.

Figure 28:
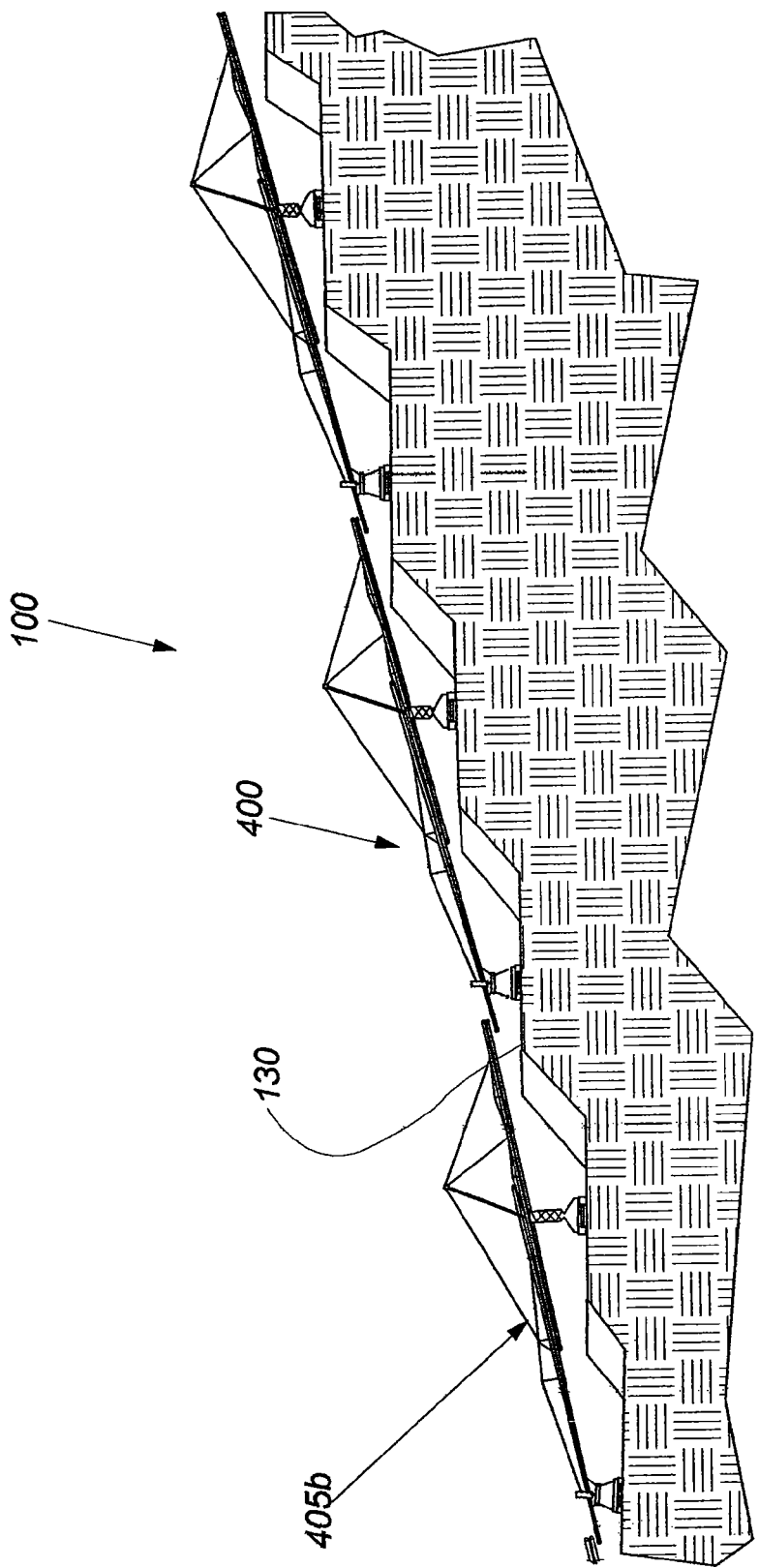
FIG. 28 shows a schematic elevation view of an uphill side of the open mining pit shown in FIG. 25.
Figure 30:
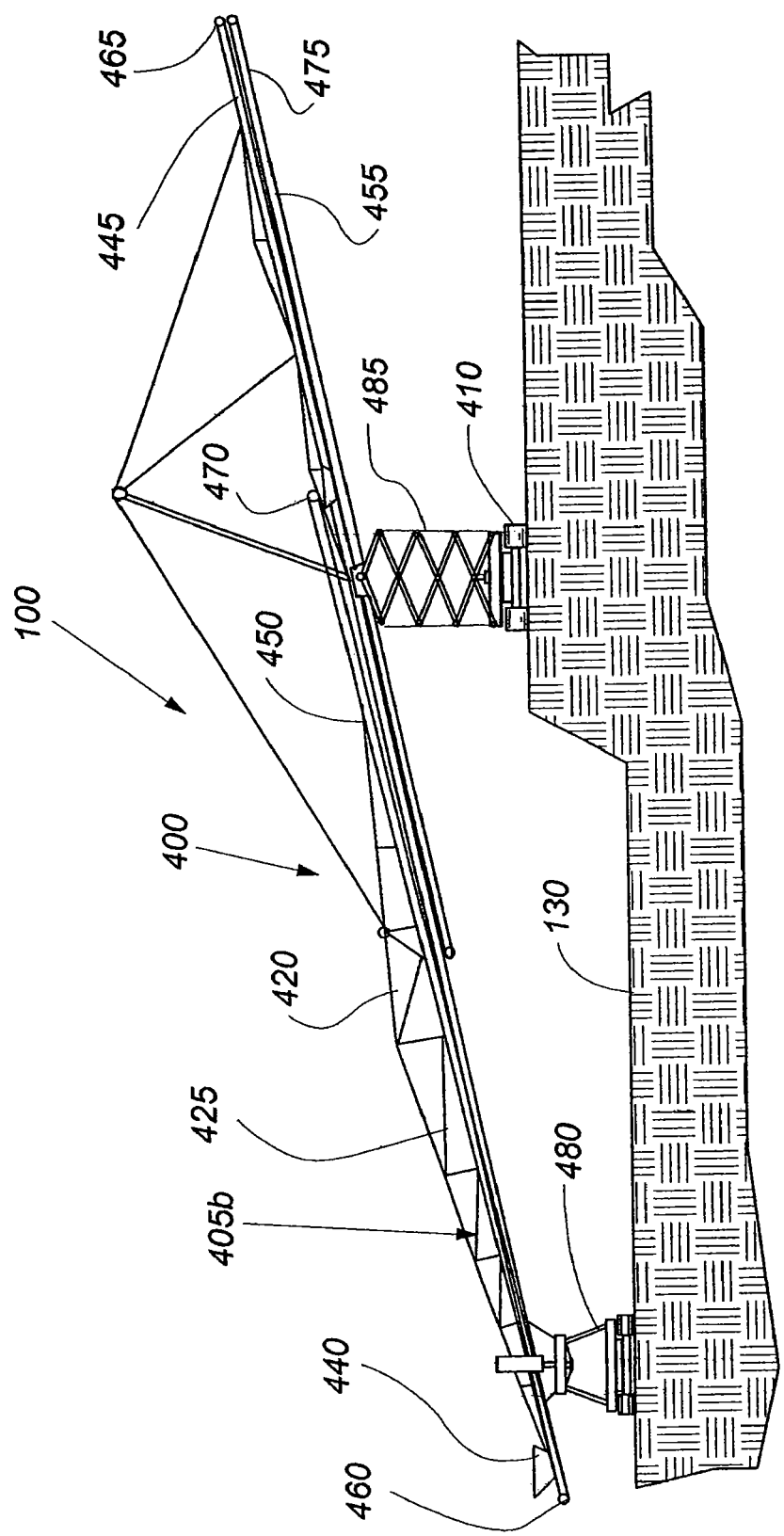
FIG. 30 shows a schematic elevation view of a portion of the downhill side of the open mining pit shown in FIG. 25.

The uphill (or stack) side mobile bridge conveyors 405b of the third system 400 further differ from the uphill side mobile bridge conveyors 140 of the system 105 shown in FIGS. 1-8 in that they include three conveyors: a long conveyor 445, a short conveyor 450, and a shuttle conveyor 455. Similar to the uphill mobile bridge conveyors 405a of the third system 400, the long and short conveyors 445, 450 are arranged in a side-by-side configuration on the bridge structure 420 for the mobile bridge conveyor 405b, and each include a receiving chute or hopper 440 mounted on a shuttle head. With reference to FIGS. 28 and 30, the long conveyor 445 extends the length of the mobile bridge conveyor 405b and is primarily used when material is to be transferred to the next mobile bridge conveyor 405b in the line 135a-c. Meanwhile, the short conveyor 450 extends from the receiving end 460 towards the discharge end 465 of the mobile bridge conveyor 405b and is primarily used to transfer material to the shuttle conveyor 455. Thus, at the discharge end 470 of the short conveyor 450, the shuttle conveyor 455 is positioned under the short conveyor 450 in order to transfer material from the short conveyor 450 to the shuttle conveyor 455. As described in more detail above for the mobile bridge conveyors 140, 305 of the first and second conveyor systems 105, 300, the shuttle conveyor 455 has a reversible belt 475 and can be moved axially relative to the crawlers 410 of the mobile bridge conveyor 405b. This flexibility of the shuttle conveyor 455 allows for material to be deposited on an upper bench or lower bench 130, or transferred to the conveyor 445, 450 of an adjacent downstream mobile bridge conveyor 405b, depending upon the position of the shuttle conveyor 455.

Providing a long and a short conveyor 445, 450 on the uphill side mobile bridge conveyors 405b adds redundancy to the bridge conveyor lines 135a-c for the haulage of overburden material. For example, if a long conveyor 445 that was transferring material to a downstream mobile bridge conveyor 405b requires repair, the short conveyor 450 in combination with the shuttle conveyor 455 could be utilized to transfer material to the adjacent mobile bridge conveyor 405b until the long conveyor 445 is repaired. Also, providing three conveyors 445, 450 reduces the frequency of belt replacement on the mobile bridge conveyors 405b since loading is distributed over three belts compared to two belts. As for the use of shuttle heads, like the shuttle heads for the downhill mobile bridge conveyors 405a, the shuttle heads for the uphill mobile bridge conveyors 405b help to align the head pulleys of the conveyors 445, 450 with the loading chute, thus making it easier to align the mobile bridge conveyors 405b in each bridge conveyor line 135a-c.

With further reference to FIGS. 28 and 30, the uphill mobile bridge conveyors 405b further include one or more hydraulic cylinders 480 at the receiving end 460 of the mobile bridge conveyors 405b. These cylinders 480 allow for adjusting the height of the receiving hopper 440. This height adjustment feature allows for the mobile bridge conveyor 405b to be fed either from another mobile bridge conveyor 405 or from a machine such as a bucket wheel or a mobile crusher. The height adjustment feature also allows for the occurrence of an inter-burden layer between two coal seams 125 since a height adjustment will often be required to accommodate a change in height of the first spoil bench 130 due to this inter-burden layer.

With continued reference to FIGS. 28 and 30, the support structure 485 of the uphill mobile bridge conveyor 405b that is positioned above the crawler 410 that is located towards the discharge end 465 of the mobile bridge conveyor 405b is modular. This modular design allows for segments, as required, to be inserted or removed to raise or lower the height of the mobile bridge conveyor 405b at the discharge end 465 of the mobile bridge conveyor 405b. Such a height adjustment may be required, for example, when there is a shallow inter-burden layer between two coal seams 125. In such a situation, the height of a spoil bench 130 may be too low to support the mobile bridge conveyor 405b at a desired angle.

The third conveyor system 400 also differs from the first conveyor system 105 with respect to the arrangement of the mobile bridge conveyors 405 at the coal seam level. In the first conveyor system 105, the bridge conveyor lines 135a-c include a mobile bridge conveyor 140 that spans over the level of the coal seam 125. In the third conveyor system 400, the bridge conveyor lines 135a-c include mobile bridge conveyors 405 whose crawlers 410 are supported at the level of the coal seam 125. Because these mobile bridge conveyors 405 have crawlers 410 that traverse the coal level in the third conveyor system 400, the mobile bridge conveyors 405 may interfere with the coal mining in the pit. To minimize this interference, the coal excavators should generally be allowed to continue working by swinging a mobile bridge conveyor 405 that is transporting overburden material out of the way of the coal excavators as the mobile bridge conveyor 405 passes the coal excavation point.

The third conveyor system 400 further differs from the first conveyor system 105 in the process for removing coal from the pit. In the first conveyor system 105, a combination of shiftable, vertical, and overland conveyors 215, 220, 225 are used to transport coal out of the pit. In the third system 400, an additional bridge conveyor line 135d of mobile bridge conveyors 405 is added to transport coal out of the pit. This coal line 135d of mobile bridge conveyors 405 is the same as the overburden material lines 135a-c except the coal line 135d is transporting coal on the mobile bridge conveyors 405 rather than overburden material. By using the same type of mobile bridge conveyors 405 in the coal line 135d, the mobile bridge conveyors 405 in the coal line 135d can be switched with those in the waste haulage lines 135a-c (i.e., the lines transporting overburden material). This ability to switch the mobile bridge conveyors 405 between the waste haulage lines 135a-c and the coal line 135d also provides redundancy in the coal line 135d since a mobile bridge conveyor 405 in a waste haulage line 135a-c can be switched with a mobile bridge conveyor 405 in the coal line 135d if the coal line's mobile bridge conveyor 405 needs repair. While a coal line 135d formed from mobile bridge conveyors 405 is shown for use in the third conveyor system 400, any other suitable coal transportation system could be used as part of the third conveyor system 400, including, but not limited to, the coal transportation system described for the first conveyor system 105. Similarly, a coal line formed from mobile bridge could be used to remove coal for the first and second systems 105, 300.

Figure 26:
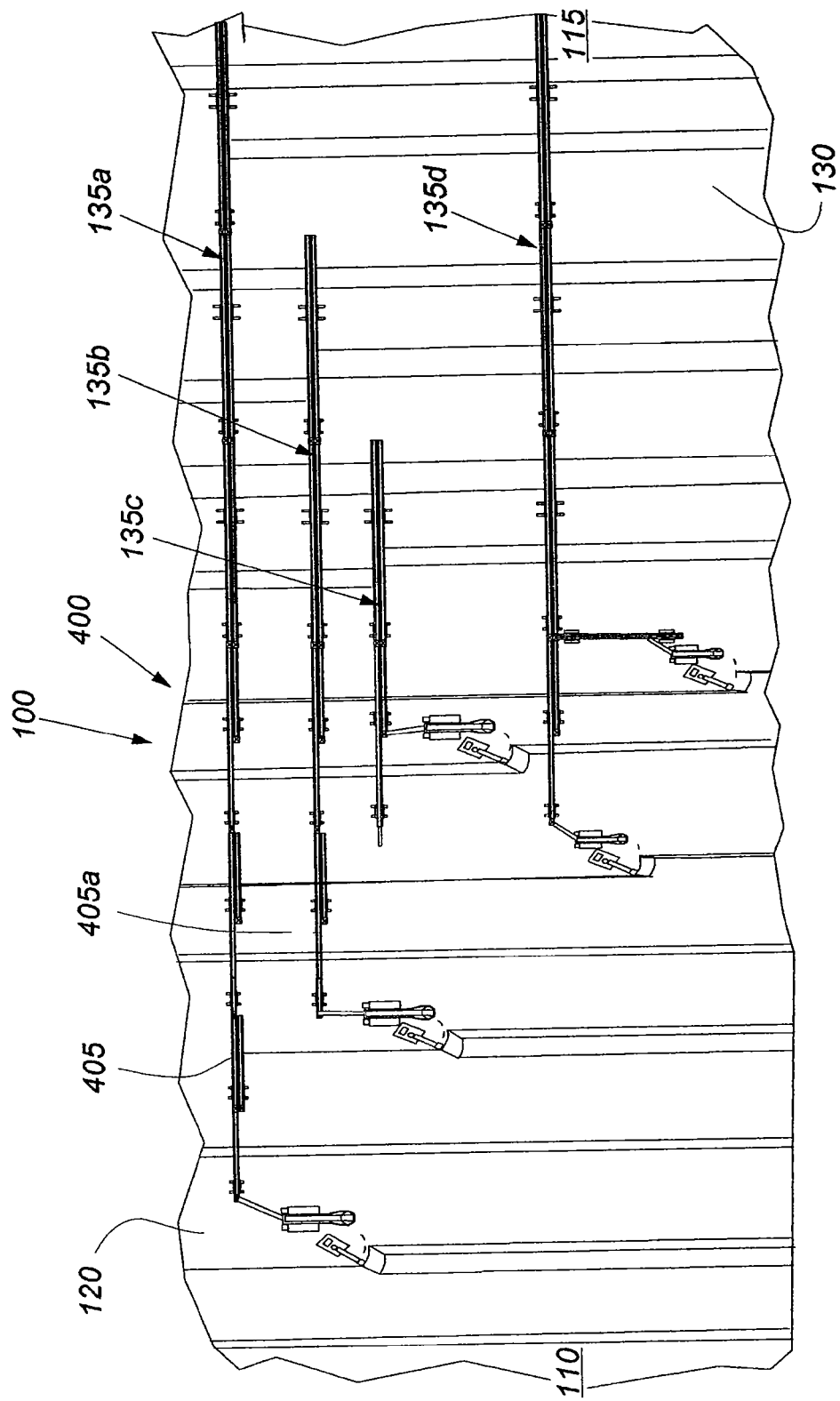
FIG. 26 shows another schematic plan view of the open mining pit shown in FIG. 25.
Figure 31:
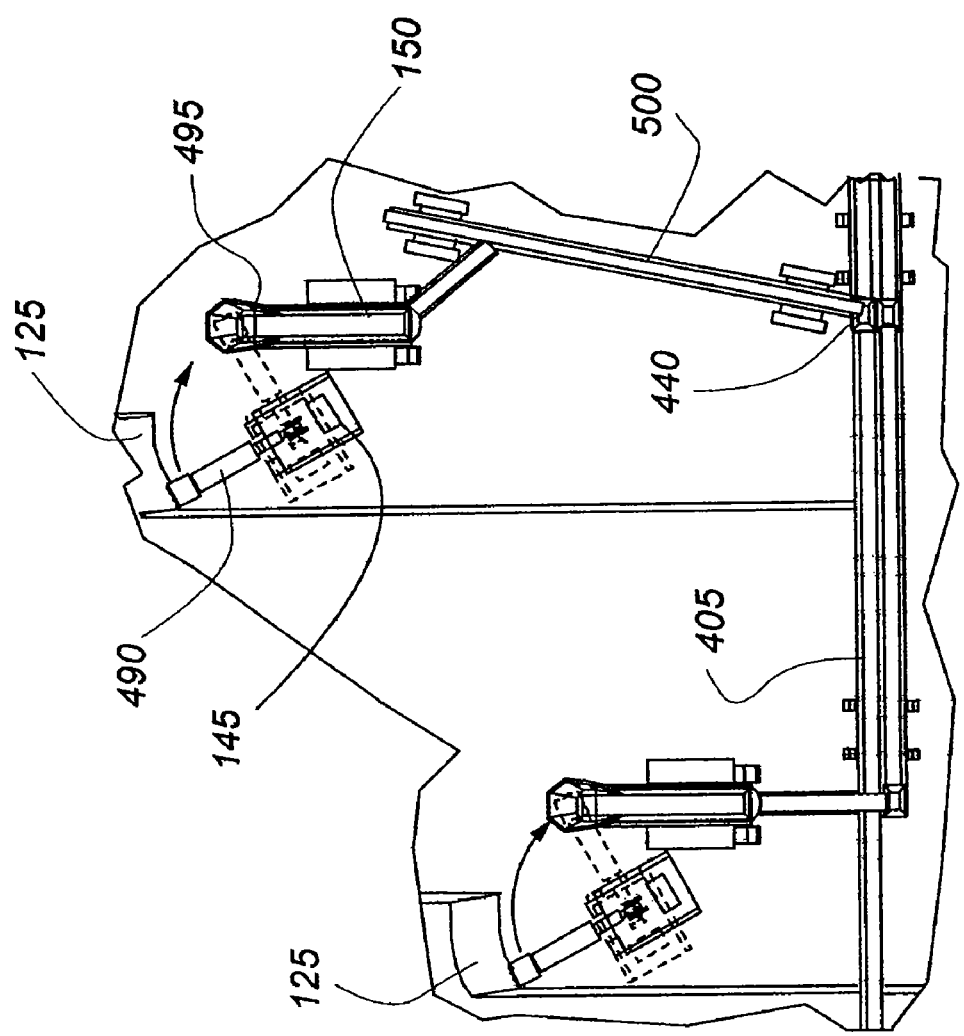
FIG. 31 shows a schematic partial plan view of the open pit mine of FIG. 25, showing a potential setup for loading coal onto a conveyor line.
Figure 33:
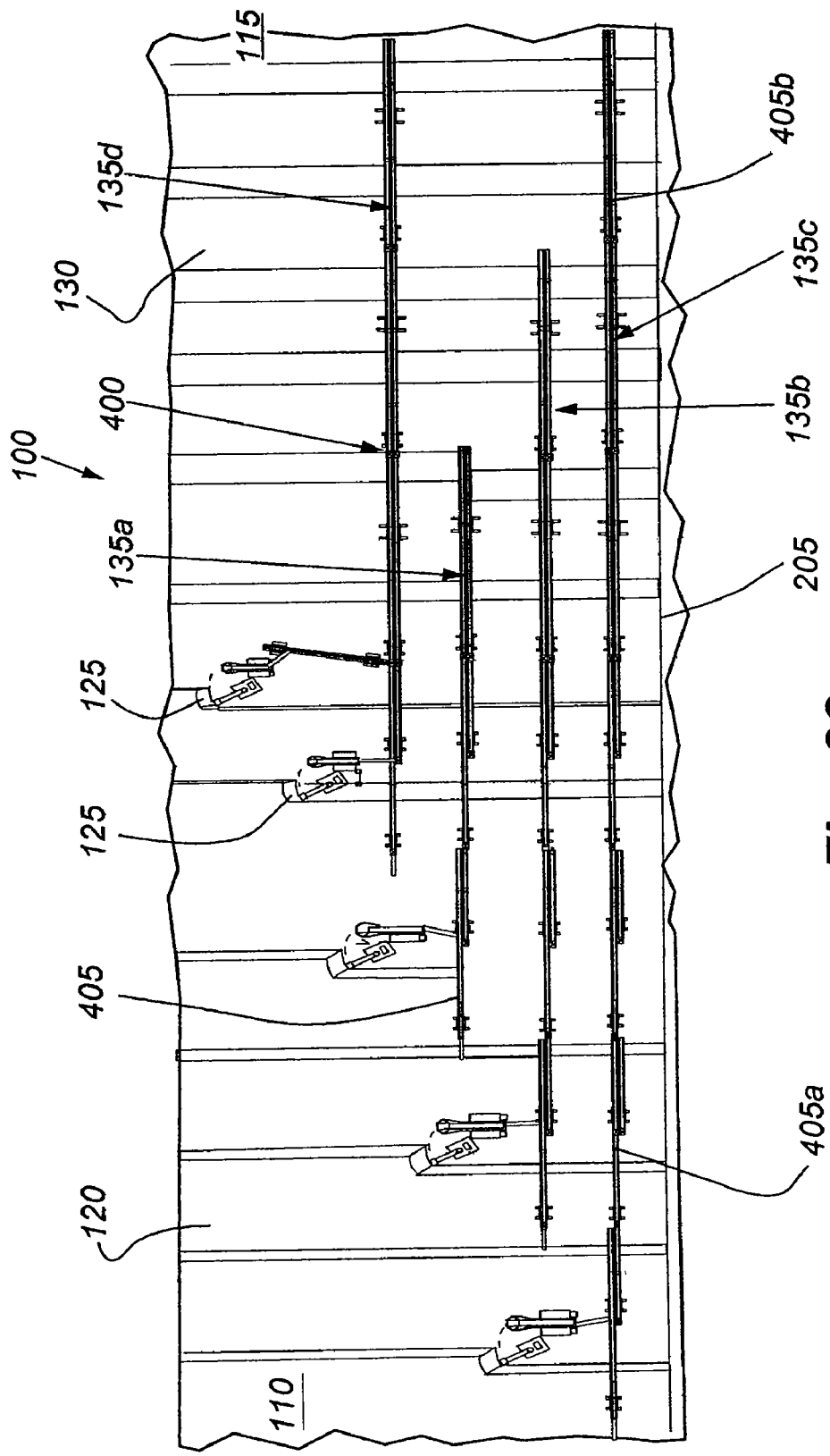
FIG. 33 shows a schematic plan view of an open mining pit showing the third possible conveyor system for transporting material from one area or location of the mine to another area or location, with the open pit mining differing from the mine in FIG. 25 because the mine shown in FIG. 25 includes two coal seams separated by an inter-burden layer while the mine in FIG. 33 shows a single coal seam.

In operation, and with reference to FIGS. 25, 26 and 31, coal is gathered using a suitable excavating machine 490, such as a shovel 145. The excavating machine 490 may then deposit the material onto a suitable intermediate transport machine 495, such as a mobile crusher 150, or directly on the mobile bridge conveyor 405. If deposited onto an intermediate transport machine 495, the coal is then transported to either a conveyor supported by the mobile bridge conveyor 405 or to another intermediate transport machine 495, such as a face conveyor 500, which in turn deposits the material onto a conveyor of the mobile bridge conveyor 405. With reference to FIG. 32, the face conveyor 500 may include a hopper car 505 that can receive coal at various location along the length of the face conveyor 500. The face conveyor 500 may further include hydraulic cylinders 480 at each that allow for adjusting the height of the face conveyor 500 at the ends. Like the adjustment mechanism for the uphill mobile conveyors 405b, the adjust mechanism for the face conveyor 500 allows for the hopper car 505 to be positioned at an appropriate elevation relative to the equipment discharging material into its hopper car 505. The direction of travel for a conveyor 510 on the face bridge 500 is reversible so that can be fed from either end.

Once the material is deposited on a conveyor of a mobile bridge conveyor 405, the coal is transported along the line 135d of mobile bridge conveyors 405 to a desired upper level of the pit. The manner of transferring the coal to adjacent mobile bridge conveyors 405 is the same as for the overburden material. The primary difference between the lines is the material being transported. After coal is transported to a desired upper level of the mine, it can either transferred to a shiftable conveyor, to a short bridge that switches coal flow from an inboard loading conveyor to an outboard loading conveyor for loading onto haul trucks, or to any other system for transporting the coal to another desired location.

For any conveyor system, including any of the above-described conveyor systems 105, 300, 400, that utilizes a line of mobile bridge conveyors 140, 305, 405 to transport material from one location of the open pit mine 100 to another location, accurate, consistent and safe alignment of the receiving and discharge ends of adjacent mobile bridge conveyors 140, 305, 405 is needed. Various methods and devices can be used to facilitate such alignment. For example, two different types of position sensor technologies, such as radar and Global Positioning System, may be used to determine a head pulley's position on a conveyor relative to a chute. The use of two independent sensor technologies facilities comparing independent inputs from the sensors to confirm the information provided by the sensors is accurate and consistent. As another example, a manual-control mode and an electronic mode can be provided to align the mobile bridge conveyors 140, 305, 405. The electronic-control mode can be used as the main method for aligning the mobile bridge conveyors 140, 305, 405, while the manual-control mode allows an operator to override the electronic-control mode in the event the electronic-control mode inaccurately aligns the mobile bridge conveyors 140, 305, 405. As yet another example, receiving chutes can be made extra wide to allow for a larger margin of acceptable alignment tolerances for the mobile bridge conveyors 140, 305, 405. As still yet another example, every sensor could have at least one back-up sensor to increase the likelihood that at least one sensor is continuously providing the necessary information for aligning and controlling the mobile bridge conveyors 140, 305, 405.

With respect to mobile bridge conveyors 405 that are cantilevered, alignment of their ends may be more difficult than aligning mobile bridge conveyors 140, 305 that are supported at each end by crawlers 180. However, application of the following movement procedures may be useful to facilitate aligning them. First, all of the mobile bridge conveyors 405 can be swung perpendicular to the benches 120, 130. Second, the receiving chute 440 of the first downhill mobile bridge conveyor 405*a* can be aligned under a mobile crusher's (or other equipment's) discharge boom by advancing both sets of crawlers 180 on the mobile bridge conveyor 405*a* more or less parallel to the bench 120. Third, a shuttle head supporting the receiving chute 440 can be used to make fine longitudinal adjustments. Fourth, the procedures in steps 2 and 3 can be repeated for the next mobile bridge conveyor 405 in the bridge conveyor line 135*a-d* to align the discharge elements of the various equipment (for example, the discharge element of a mobile bridge conveyor 405) with the receiving chutes 440 of these other mobile bridge conveyors 405. Fifth, if a transfer point starts to move out of alignment during movement of a bridge conveyor line 135*a-d* along a bench 120, 130, the crawler 180 supporting the boom that discharges at this transfer point can be moved to swing the discharge pulley back into position. Such a movement leaves the other alignment points undisturbed with the exception of a moderate movement of the receiving chute 440 at the other end of the mobile bridge conveyor 405 that is adjusted by movement of its crawler 180.

While the conveyor methods and systems have been shown and described as using specific mobile bridge conveyors 140, 305, 405 to transport material from the overburden side 110 to the stack side 115 of the mine 100, any suitable mobile conveyor, for example, mobile cable supported conveyors or the like, could be used in place of any or all of the mobile bridge conveyors. Further, the methods and systems could be used for mining material other than coal in an open pit mine.

All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for operating a conveyor system in an open pit mine, comprising:
   moving a first conveyor line in a first direction;
   moving a second conveyor line in a second direction, the second direction opposite the first direction such that the first and the second conveyor lines move towards each other; and
   when the first conveyor line is proximate the second conveyor line, removing at least one mobile bridge conveyor from either the first or second conveyor lines and adding the removed at least one mobile bridge conveyor to the other conveyor line.

2. The method of claim 1, further comprising after the removal and addition operation, moving the first conveyor line in the second direction and the second conveyor line in the first direction.

3. The method of claim 2, further comprising:
   moving a third conveyor line in the second direction such that the second and the third conveyor lines move towards each other; and
   when the second conveyor line is proximate the third conveyor line, removing at least one mobile bridge conveyor from either the second or third conveyor lines and adding the removed at least mobile bridge conveyor to the other conveyor line.

4. The method of claim 3, further comprising after the removal and addition operation for the second and third conveyor lines, moving the second conveyor line in the second direction and the third conveyor line in the first direction.

5. The method of claim 4, further comprising:
   again moving the first conveyor line in the first direction such that the first and the second conveyor lines move towards each other; and
   when the first conveyor line is proximate the second conveyor line, removing at least one mobile bridge conveyor from either the first or second conveyor lines and adding the removed at least mobile bridge conveyor to the other conveyor line.

6. The method of claim 5, further comprising after the removal and addition operation for the first and second conveyor lines for the second time, moving the first conveyor line in the second direction and the second conveyor line in the first direction.

7. The method of claim 6, further comprising moving the first conveyor line for the second time in the second direction until the first conveyor line reaches an end wall of the mine, and moving the first conveyor line in the first direction after the first conveyor line reaches the end wall.

* * * * *